(12) United States Patent
Saito et al.

(10) Patent No.: US 11,267,255 B2
(45) Date of Patent: *Mar. 8, 2022

(54) IMAGE FORMING METHOD, IMAGE FORMING APPARATUS, AND METHOD FOR MANUFACTURING PRINTED MATTER

(71) Applicant: RICOH COMPANY, LTD., Tokyo (JP)

(72) Inventors: Shun Saito, Kanagawa (JP); Hiromi Sakaguchi, Kanagawa (JP); Takashi Tamai, Kanagawa (JP); Sayuri Kojima, Kanagawa (JP); Yuya Hirokawa, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 13 days.

This patent is subject to a terminal disclaimer.

(21) Appl. No.: 16/851,208

(22) Filed: Apr. 17, 2020

(65) Prior Publication Data

US 2020/0238731 A1 Jul. 30, 2020

Related U.S. Application Data

(63) Continuation of application No. 15/792,833, filed on Oct. 25, 2017, now Pat. No. 10,723,142.

(30) Foreign Application Priority Data

Nov. 8, 2016 (JP) .............................. JP2016-218335
Oct. 5, 2017 (JP) .............................. JP2017-195149

(51) Int. Cl.
*B41J 11/00* (2006.01)
*B41J 2/21* (2006.01)
(Continued)

(52) U.S. Cl.
CPC .............. *B41J 2/2107* (2013.01); *B41J 2/03* (2013.01); *B41J 2/04501* (2013.01); *B41J 2/14* (2013.01);
(Continued)

(58) Field of Classification Search
CPC ...... B41J 11/0015; B41J 2/2107; B41M 7/00; C09D 11/30
See application file for complete search history.

(56) References Cited

U.S. PATENT DOCUMENTS 5,620,831 A * 4/1997 Kawana ................ C07C 279/28
430/280.1
10,723,142 B2 * 7/2020 Saito ........................ B41J 2/211
(Continued)

FOREIGN PATENT DOCUMENTS

JP 2002029140 1/2002
JP 4600791 12/2010
(Continued)

OTHER PUBLICATIONS

Shigenori Kuga, et al., "Development and application of dynamic scanning absorptometer—Automation and improvement of Bristow measurement-" Japan Tappi Journal vol. 48(1994) No. 5. p. 730-734. (with English Abstract).
(Continued)

*Primary Examiner* — Matthew Luu
*Assistant Examiner* — Kendrick X Liu
(74) *Attorney, Agent, or Firm* — Grüneberg and Myers PLLC

(57) ABSTRACT

An image forming method is provided. The method includes the steps of (a) applying an ink to a recording medium to form an image and (b) applying a pressure to the recording medium to which the ink has been applied. The ink comprises water, an organic solvent, and a colorant. When the ink is formed into an ink film, a maximum value of logarithmic damping ratio of the ink film is 1.50 or less and a time elapsed until the logarithmic damping ratio reaches the maximum value is 3,800 seconds or less, when measured by a rigid-body pendulum test at 60° C.

31 Claims, 4 Drawing Sheets

(51) Int. Cl.
- *B41M 7/00* (2006.01)
- *C09D 11/30* (2014.01)
- *B41J 2/03* (2006.01)
- *B41J 2/175* (2006.01)
- *B41J 2/045* (2006.01)
- *B41J 2/14* (2006.01)

(52) U.S. Cl.
CPC ............ *B41J 2/175* (2013.01); *B41J 2/211* (2013.01); *B41J 11/0015* (2013.01); *B41M 7/00* (2013.01); *C09D 11/30* (2013.01)

(56) References Cited

U.S. PATENT DOCUMENTS

| | | |
|---|---|---|
| 2008/0165237 A1 | 7/2008 | Yamauchi |
| 2010/0245416 A1 | 9/2010 | Ohshima |
| 2011/0211031 A1 | 9/2011 | Satoh et al. |
| 2012/0164400 A1 | 6/2012 | Nagahama |
| 2013/0293629 A1 | 11/2013 | Niino et al. |
| 2014/0043393 A1 | 2/2014 | Takeuchi |
| 2015/0077465 A1 | 3/2015 | Haijima |
| 2016/0082726 A1 | 3/2016 | Yoneyama et al. |
| 2016/0090497 A1 | 3/2016 | Ito |
| 2016/0376455 A1 | 12/2016 | Katoh et al. |
| 2017/0009092 A1 | 1/2017 | Gotou et al. |
| 2017/0022381 A1 | 1/2017 | Takamura et al. |
| 2017/0121543 A1 | 5/2017 | Sakaguchi et al. |
| 2017/0130081 A1 | 5/2017 | Toyama et al. |
| 2017/0355201 A1 | 12/2017 | Hojo |
| 2018/0142110 A1 | 5/2018 | Maeda |

FOREIGN PATENT DOCUMENTS

| | | |
|---|---|---|
| JP | 2011-178497 | 9/2011 |
| JP | 2013-248883 | 12/2013 |
| JP | 2015-168240 | 9/2015 |
| JP | 2016037521 | 3/2016 |
| JP | 2016060186 | 4/2016 |
| JP | 2016069579 | 5/2016 |
| WO | 2017/204073 | 11/2017 |

OTHER PUBLICATIONS

Japanese Offie Action dated Jul. 13, 2021 in Japanese Application No. 2017-195149, with English translation, 10 pages.

\* cited by examiner

IMAGE FORMING METHOD, IMAGE FORMING APPARATUS, AND METHOD FOR MANUFACTURING PRINTED MATTER

CROSS-REFERENCE TO RELATED APPLICATIONS

This patent application is a continuation of U.S. patent application Ser. No. 15/792,833, filed on Oct. 25, 2017, and is based on and claims priority pursuant to 35 U.S.C. § 119(a) to Japanese Patent Application Nos. 2016-218335 and 2017-195149, filed on Nov. 8, 2016 and Oct. 5, 2017, respectively, in the Japan Patent Office, the entire disclosure of each of which is hereby incorporated by reference herein.

CROSS-REFERENCE TO RELATED APPLICATIONS

This patent application is based on and claims priority pursuant to 35 U.S.C. § 119(a) to Japanese Patent Application Nos. 2016-218335 and 2017-195149, filed on Nov. 8, 2016 and Oct. 5, 2017, respectively, in the Japan Patent Office, the entire disclosure of each of which is hereby incorporated by reference herein.

BACKGROUND

Technical Field

The present disclosure relates to an image forming method, an image forming apparatus, and a method for manufacturing printed matter.

Description of the Related Art

Inkjet recording devices have advantages that noise is low and operability is high. In addition, inkjet recording devices are easy to produce color images on plain paper. For this reason, inkjet recording devices are now widely diffusing from home use to office use.

Inkjet technology has also been applied to digital printers for industrial use. For example, printers capable of recording information with solvent ink or ultraviolet-curable ink on non-absorptive recording media have been put into a market. On the other hand, demand for water-based inks is increasing for environmental protection.

Conventional water-based inkjet inks have been developed for limited applications, e.g., for plain paper or special paper such as glossy photo paper. On the other hand, there is an increasing demand for extended application of inkjet printing for coated paper. However, since coated paper is poor in permeability, it is generally difficult to strongly fix pigments on coated paper, resulting in an image with poor abrasion resistance.

SUMMARY

In accordance with some embodiments of the present invention, an image forming method is provided. The method includes the steps of (a) applying an ink to a recording medium to form an image and (b) applying a pressure to the recording medium to which the ink has been applied. The ink comprises water, an organic solvent, and a colorant. When the ink is formed into an ink film, a maximum value of logarithmic damping ratio of the ink film is 1.50 or less and a time elapsed until the logarithmic damping ratio reaches the maximum value is 3,800 seconds or less, when measured by a rigid-body pendulum test at 60° C.

In accordance with some embodiments of the present invention, an image forming apparatus is provided. The image forming apparatus includes a first ink applier, a pressurizer, and an ink. The first ink applier is configured to apply an ink to a recording medium to form an image. The pressurizer is configured to apply a pressure to the recording medium to which the ink has been applied. The ink comprises water, an organic solvent, and a colorant. When the ink is formed into an ink film, a maximum value of logarithmic damping ratio of the ink film is 1.50 or less and a time elapsed until the logarithmic damping ratio reaches the maximum value is 3,800 seconds or less, when measured by a rigid-body pendulum test at 60° C.

In accordance with some embodiments of the present invention, a method of manufacturing printed matter is provided. The method includes the steps of (a) applying an ink to a recording medium to form an image and (b) applying a pressure to the recording medium to which the ink has been applied. The ink comprises water, an organic solvent, and a colorant. When the ink is formed into an ink film, a maximum value of logarithmic damping ratio of the ink film is 1.50 or less and a time elapsed until the logarithmic damping ratio reaches the maximum value is 3,800 seconds or less, when measured by a rigid-body pendulum test at 60° C.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
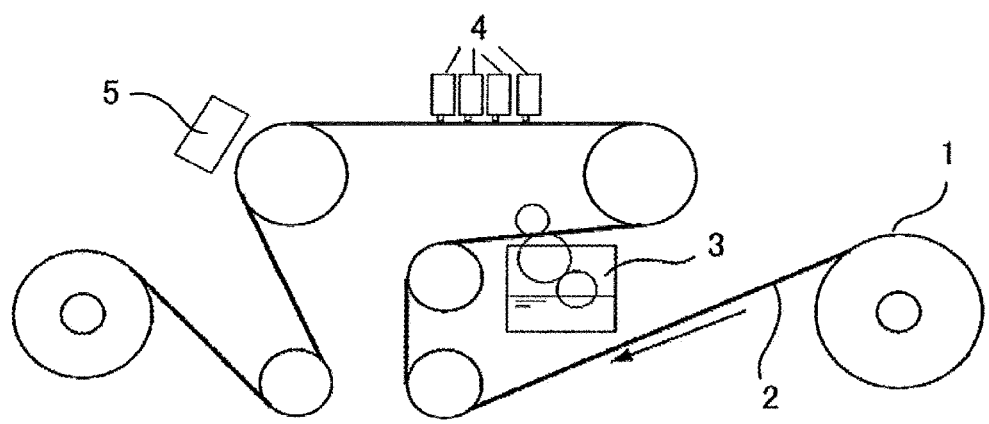
FIG. 1 is a schematic view of an image forming apparatus in accordance with some embodiments of the present invention that uses a continuous sheet.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

In accordance with some embodiments of the present invention, an image forming method is provided that is capable of forming an image that causes no offset even under pressure, while exhibiting high blocking resistance, excellent abrasion resistance, and high gloss.

Image Forming Method, Image Forming Apparatus, and Image Forming System

In accordance with some embodiments of the present invention, an image forming method is provided that includes the steps of: (a) applying an ink to a recording medium to form an image (hereinafter "first ink applying process"); and (b) applying a pressure to the recording medium to which the ink has been applied (hereinafter "pressurizing process"). The ink comprises water, an organic solvent, and a colorant. When the ink is formed into an ink film, a maximum value of logarithmic damping ratio of the ink film is 1.50 or less and a time elapsed until the logarithmic damping ratio reaches the maximum value is 3,800 seconds or less, when measured by a rigid-body pendulum test at 60° C. The pressure may be in the range of from 3.5 to 8.0 kg/cm$^2$. The image forming method may further include other processes.

This image forming method is achieved based on the finding that images formed with conventional rolled sheet conveyers are poor in blocking resistance.

In addition, the inventors of the present invention have found the following fact.

Adding a resin emulsion to an ink is known to be one technique for improving fixability of the ink. However, such a resin capable of improving fixability generally exhibits high elasticity and thus the maximum value of logarithmic damping ratio of the ink is raised by addition of the resin. The inventors of the present invention have found that as the maximum value of logarithmic damping ratio gets larger, the image gets transferred (or offset) from the recording medium at the time a pressure is applied to the image, such as a time of fixing the image on the recording medium by a fixing roller, or winding the recording medium in a case in which the recording medium is a rolled sheet.

FIG. 1 illustrates an image forming apparatus that uses a continuous sheet. This image forming apparatus includes a sheet feeder 1, a recording medium 2, a pretreatment liquid applier 3, an ink discharge head 4, and a dryer 5. In this image forming apparatus, when the continuous sheet is wound in a roll after an image is formed thereon, a large pressure is applied to around the central part of the roll to cause offset of the image.

Offset of the image can be caused not only at around the central part but also at the peripheral part of the roll when, for example, the continuous sheet is rewound by tension and a large pressure is applied thereto. There is a case in which a second ink applying process (hereinafter may be referred to as "additional printing") is further performed after the continuous sheet is wound up after the first ink applying process. In the second ink applying process, an ink is further applied to the same side of the continuous sheet to which the ink has been already applied in the first ink applying process. In this case, if the winding pressure after the first ink applying process is large, the continuous sheet will be wound in a uniform roll and a clear image will be formed thereon in the second ink applying process. However, there still remains the problem of image offset. On the other hand, if the winding pressure is small, the continuous sheet will be wound in a nonuniform roll that is not stretched but retain slack. As a result, in the second ink applying process, the sheet cannot be fed at a constant speed and a position misalignment may occur.

In accordance with some embodiments of the present invention, the ink is preferably applied to the same side of the recording medium in both the first and second ink applying processes, because the above problem has been solved. Of course, the ink may be applied to the opposite sides of the recording medium in the first and second ink applying processes, respectively.

In accordance with some embodiments of the present invention, an image forming apparatus is provided that includes: a first ink applier configured to apply an ink to a recording medium to form an image; a pressurizer configured to apply a pressure to the recording medium to which the ink has been applied; and an ink comprising water, an organic solvent, and a colorant. When the ink is formed into an ink film, a maximum value of logarithmic damping ratio of the ink film is 1.50 or less and a time elapsed until the logarithmic damping ratio reaches the maximum value is 3,800 seconds or less, when measured by a rigid-body pendulum test at 60° C. The pressure may be in the range of from 3.5 to 8.0 kg/cm$^2$.

In accordance with some embodiments of the present invention, an image forming system is provided that includes: a first ink applier configured to apply an ink to a recording medium to form an image; a pressurizer configured to apply a pressure to the recording medium to which the ink has been applied; and an ink comprising water, an organic solvent, and a colorant. When the ink is formed into an ink film, a maximum value of logarithmic damping ratio of the ink film is 1.50 or less and a time elapsed until the logarithmic damping ratio reaches the maximum value is 3,800 seconds or less, when measured by a rigid-body pendulum test at 60° C. The pressure may be in the range of from 3.5 to 8.0 kg/cm$^2$.

Logarithmic Damping Ratio

When the ink is formed into an ink film, the maximum value of logarithmic damping ratio of the ink film is 1.50 or less, preferably from 0.01 to 1.50, and more preferably from 0.7 to 1.50, when measured by a rigid-body pendulum test at 60° C. When the maximum value of logarithmic damping ratio is 1.50 or less, the ink film is suppressed from becoming sticky and thus the occurrence of blocking is prevented.

The time elapsed until the logarithmic damping ratio reaches the maximum value is 3,800 seconds or less, preferably from 100 to 3,800 seconds, and more preferably 1,700 to 3,800 seconds. When the time elapsed until the logarithmic damping ratio reaches the maximum value is 3,800 seconds or less, the ink film forming speed can be increased and the occurrence of blocking can be prevented. Here, the time elapsed until the logarithmic damping ratio reaches the maximum value is measured from the time of starting measurement of logarithmic damping ratio.

When the maximum value of logarithmic damping ratio is 1.50 or less and the time elapsed until the logarithmic damping ratio reaches the maximum value is 3,800 seconds or less, the image causes no blocking even when a pressure of from 3.5 to 8.0 kg/m² is applied thereto while exhibiting high abrasion resistance and gloss. In addition, as tackiness of the ink film is less likely to increase during the ink film formation process, the ink film is prevented from sticking to the backing sheet and thus the occurrence of blocking is suppressed. Because no blocking will occur, it is possible to wind the sheet tightly, thus improving fixability. As the sheet is wound tightly, the surface of the image is smoothened and glossiness is increased.

The logarithmic damping ratio is determined as follows.

As a measuring instrument, a Rigid-body Pendulum Type Physical Properties Testing Instrument RPT-3000W (available from A&D Company, Limited) is used. An ink film is formed by dropping 40 μL of the ink onto an aluminum substrate and spreading the dropped ink into a film having a thickness of 100 μm using a coating jig (PCT-100). The ink film is immediately set along with a cold block (CHB-100). A cylinder edge (RBP-040) and a pendulum (FRB-100) are set up, and two weights exclusive for FRB-100 are set at the lowest part of the pendulum. The measurement temperature is raised from normal temperature (25° C.) to 60° C. at a rate of 5° C./min and kept at 60° C. thereafter. The logarithmic damping ratio and temperature are plotted along the time. The obtained curve is smoothened and the maximum value thereof is calculated to determine the maximum value of logarithmic damping ratio. The maximum value of logarithmic damping ratio can indicate a force related to tackiness.

A logarithmic damping ratio ($D'(n)$) after the smoothing can be determined from the following formulae, where $D(n)$ represents logarithmic damping ratio of the $n^{th}$ plot.

$$D'(n)=\{D(n-2)+D(n-1)+D(n)+D(n+1)+D(n+2)\}/5$$

$$D'(1)=D(1)$$

$$D'(2)=\{D(1)+D(2)\}/2$$

Figure 2:
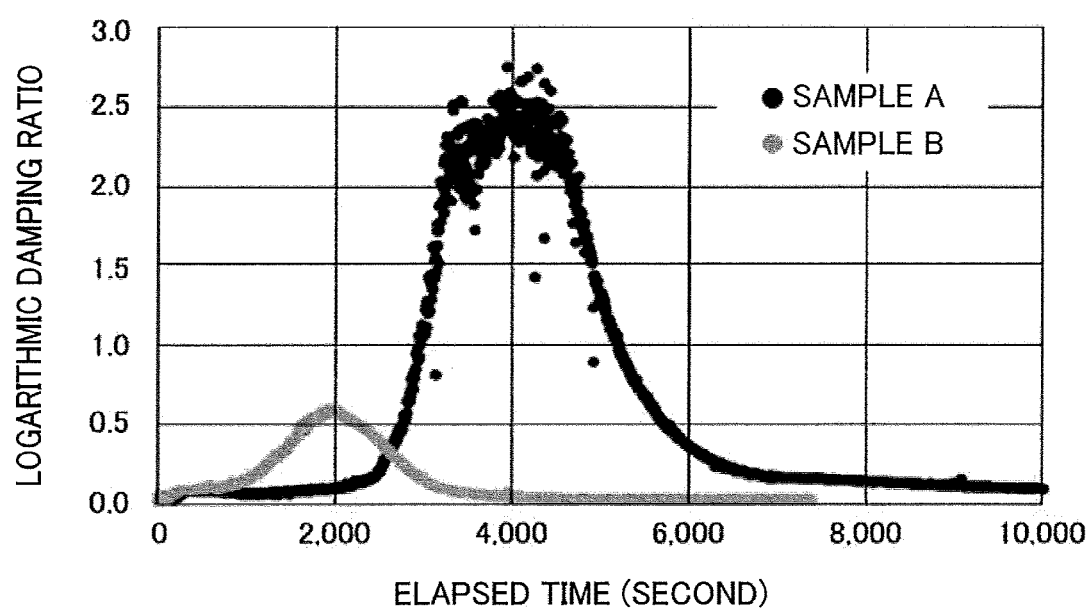
FIG. 2 is a graph showing a relation between logarithmic damping ratio and elapsed time.

FIG. 2 is a graph showing a relation between logarithmic damping ratio and elapsed time. Referring to FIG. 2, with respect to Sample A, the maximum value of logarithmic damping ratio is in excess of 1.50 and the time elapsed until the logarithmic damping ratio reaches the maximum value is in excess of 3,800 seconds. By contrast, with respect to Sample B, the maximum value of logarithmic damping ratio is 1.50 or less and the time elapsed until the logarithmic damping ratio reaches the maximum value is 3,800 seconds or less. When the maximum value of logarithmic damping ratio is 1.50 or less and the time elapsed until the logarithmic damping ratio reaches the maximum value is 3,800 seconds or less, as is the case with Sample B, blocking resistance, abrasion resistance, and glossiness are improved.

Pressure in Pressurizing Process

In the pressurizing process, the pressure applied to the recording medium to which the ink has been applied is in the range of from 3.5 to 8.0 kg/cm², and preferably from 3.5 to 7.3 kg/cm². When the pressure is 3.5 kg/cm² or more, the image can be sufficiently fixed and abrasion resistance of the image is improved. When the pressure is 8.0 kg/cm² or less, the image is prevented from being offset to a pressure roller, stacked image, or paper sheet. There is no limit on how to measure the pressure. The pressure can be measured by any known device. Even in a case in which the pressure is generated by winding the continuous sheet in a roll after the ink has been applied thereto, there is no limit on how to measure the pressure. For example, an instrument T-SCAN 5027 (available from Nitta Corporation) can be used to measure the pressure.

The pressure applied to the recording medium to which the ink has been applied is equivalent to the set pressure of the pressure roller.

It is possible to adjust the pressure within the range of from 3.5 to 8.0 kg/cm² by simply stacking the pressure roller on the image without applying tension.

In this case, for example, the pressure becomes 3.5 kg/m² and 8.0 kg/m² when the diameter (winding thickness) of the roll is 0.5 m and 1.5 m, respectively.

The pressure applied to the rolled continuous sheet may be calculated from diameter, height, and mass of the rolled continuous sheet that can be determined from photographs and information thereof.

In the pressurizing process, in a case in which the recording medium is a continuous sheet, it is preferable that the pressure is generated as the continuous sheet to which the ink gas been applied is wound in a roll.

When the maximum value of logarithmic damping ratio and the time elapsed until the logarithmic damping ratio reaches the maximum value are within in the above-specified ranges, the image causes no offset when a pressure within the above-specified range is applied thereto, while exhibiting blocking resistance, abrasion resistance, and high glossiness. In addition, when the pressure is within the above-specified range, the winding pressure is sufficient to perform the additional printing without any problem.

First Ink Applying Process and First Ink Applier

The first ink applying process is a process in which an ink is applied to a recording medium to form an image.

The first ink applier is configured to apply an ink to a recording medium to form an image.

The first ink applying process is preferably performed by the first ink applier.

The maximum value of logarithmic damping ratio of the ink film and the time elapsed until the logarithmic damping ratio reaches the maximum value vary depending on the types of compositional materials (e.g., resin) of the ink. Preferred types and amounts of resins to be added to the ink, for achieving the preferred maximum value of logarithmic damping ratio and the preferred time elapsed until the logarithmic damping ratio reaches the maximum value, are described later.

Ink

Compositional materials of the ink (e.g., organic solvent, water, colorant, resin, and other additives) are described in detail below.

Organic Solvent

There is no specific limitation on the type of the organic solvent. For example, water-soluble organic solvents are usable. Examples of water-soluble organic solvents include polyols, ethers (e.g., polyol alkyl ethers, polyol aryl ethers), nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and 3-methyl-1,3,5- pentanetriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate; and ethylene carbonate.

In particular, organic solvents having a boiling point of 250° C. or less are preferable since they can function as a wetting agent while providing good drying property.

In addition, polyol compounds having 8 or more carbon atoms and glycol ether compounds are also preferable. Specific examples of the polyol compounds having 8 or more carbon atoms include, but are not limited to, 2-ethyl-1,3-hexanediol and 2,2,4-trimethyl-1,3-pentanediol.

Specific examples of the glycol ether compounds include, but are not limited to, polyol alkyl ethers such as ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monomethyl ether, and propylene glycol monoethyl ether; and polyol aryl ethers such as ethylene glycol monophenyl ether and ethylene glycol monobenzyl ether.

In particular, the polyol compounds having 8 or more carbon atoms and the glycol ether compounds, exemplified above, are capable of improving paper-permeability of the ink, which is advantageous when the ink is printed on a recording medium made of paper.

Preferably, the glycol ether compound has no hydroxyl group. Specific preferred examples of the glycol ether compound having no hydroxy group include the glycol ether compound represented by the following formula (1).

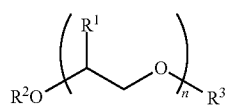

Formula (1)

In the formula (1), $R^1$ represents a hydrogen atom or alkyl group having 1 to 10 carbon atoms, each of $R^2$ and $R^3$ independently represents an alkyl group having 1 to 10 carbon atoms, and n represents an integer of from 1 to 5.

In the formula (1), $R^1$ represents a hydrogen atom or alkyl group having 1 to 10 carbon atoms, preferably a hydrogen atom or methyl group.

In the formula (1), $R^2$ represents an alkyl group having 1 to 10 carbon atoms, preferably methyl group or ethyl group.

In the formula (1), $R^3$ represents an alkyl group having 1 to 10 carbon atoms, preferably methyl group, ethyl group, or butyl group.

In the formula (1), n represents an integer of from 1 to 5, preferably from 2 to 3.

Specific examples of the glycol ether compound represented by the formula (1) include, but are not limited to, tripropylene glycol monobutyl ether, triethylene glycol dimethyl ether, diethylene glycol diethyl ether, dipropylene glycol dimethyl ether, and tripropylene glycol dimethyl ether.

Preferably, the content rate of the organic solvent in the ink is in the range of from 10% to 60% by mass, more preferably from 20% to 60% by mass, and most preferably from 2.0% to 8.0% by mass, for drying property and discharge reliability of the ink.

Resin

The ink may comprise a resin. Specific examples the resin include, but are not limited to, urethane resin, polyester resin, acrylic resin, vinyl acetate resin, styrene resin, butadiene resin, styrene-butadiene resin, vinyl chloride resin, acrylic styrene resin, and acrylic silicone resin.

These resins may be in the form of particles (hereinafter "resin particles"). The resin particles may be dispersed in water to become a resin emulsion. The ink can be obtained by mixing the resin emulsion with other materials such as colorant and organic solvent. The resin particles are available either synthetically or commercially. The resin particles may include one type or two or more types of resin particles.

For abrasion resistance, urethane resin particles are preferable.

Urethane Resin Particles

The urethane resin particles may comprise polyurethane that is obtained by binding an isocyanate compound having multiple isocyanate groups with a polyol compound having multiple hydroxyl groups by urethane bonds. Each of the isocyanate compound and the polyol compound may be a polymer compound itself.

Isocyanate Compound

Examples of the isocyanate compound having multiple isocyanate groups used to obtain polyurethane include, but are not limited to, difunctional isocyanate compounds, trifunctional isocyanate compounds, and tetrafunctional isocyanate compounds. Each of these compounds can be used alone or in combination with others.

Specific examples of the difunctional isocyanate compounds include, but are not limited to, isophorone diisocyanate, cyclohexane diisocyanate, 1,6-hexane diisocyanate, 1,4-butane diisocyanate, 1,4-benzene diisocyanate, and diphenylmethane diisocyanate.

Specific examples of the trifunctional isocyanate compounds include, but are not limited to, 1,3,5-cyclohexane triisocyanate, 1,4,8-octane triisocyanate, and 1,3,5-benzene triisocyanate.

Specific examples of the tetrafunctional isocyanate compounds include, but are not limited to, 1,2,5,6-cyclohexane tetraisocyanate.

The resulting polyurethane is varied in mechanical strength and fade resistance depending on the type of isocyanate compound used. Among these compounds, isophorone diisocyanate and cyclohexane diisocyanate are preferable in terms of handling property in mass production, environmental conservation, and operability of physical properties.

Polyol Compound

Specific examples of the polyol compound include, but are not limited to: alkylene glycols (e.g., ethylene glycol, 1,2-propylene glycol, 1,3-propylene glycol, 1,4-butanediol, 1,6-hexanediol); alkylene ether glycols (e.g., diethylene glycol, triethylene glycol, dipropylene glycol, polyethylene glycol, polypropylene glycol, polytetramethylene glycol); alicyclic diols (e.g., 1,4-cyclohexanedimethanol, hydrogenated bisphenol A); bisphenols (e.g., bisphenol A, bisphenol F, bisphenol S); alkylene oxide (e.g., ethylene oxide, propylene oxide, butylene oxide) adducts of the alicyclic diols; 4,4'-dihydroxybiphenyls (e.g., 3,3'-difluoro-4,4'-dihydroxybiphenyl); bis(hydroxyphenyl)alkanes (e.g., bis(3-fluoro-4-hydroxyphenyl)methane, 1-phenyl-1,1-bis(3-fluoro-4-hydroxyphenyl)ethane, 2,2-bis(3-fluoro-4-hydroxyphenyl)propane, 2,2-bis(3,5-difluoro-4-hydroxyphenyl)propane (also known as tetrafluorobisphenol A), 2,2-bis(3-hydroxyphenyl)-1,1,1,3,3,3-hexafluoropropane); bis(4-hydroxyphenyl) ethers (e.g., bis(3-fluoro-4-hydroxyphenyl) ether); and alkylene oxide (e.g., ethylene oxide, propylene oxide, butylene oxide) adducts of the bisphenols. Each of these compounds can be used alone or in combination with others.

Specific examples of the polyol compound further include carbonate-based polyols, ester-based polyols, and ether-based polyols. Each of these compounds can be used alone or in combination with others. Each of these polyol compounds has at least two hydroxyl groups.

Preferably, the polyol compound has hydroxyl groups on both terminals from a synthetic point of view.

Specific preferred examples of the carbonate-based polyols include a compound represented by the following formula (A).

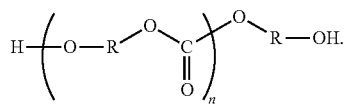

Formula (A)

Specific preferred examples of the ester-based polyols include a compound represented by the following formula (B).

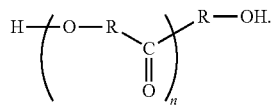

Formula (B)

Specific preferred examples of the ether-based polyols include a compound represented by the following formula (C).

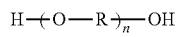

Formula (C)

In each of the formulae (A) to (C), R may independently represent hexamethylene group, cyclohexane group, phenylene group, tetramethylene group, cyclohexane dimethylene group, or cyclohexane monomethylene group, but is not limited thereto. In addition, n represents a numeral of from 1 to 20.

The volume average particle diameter of the resin particles is not particularly limited and can be suitably selected to suit to a particular application. Preferably, the volume average particle diameter is in the range of from 10 to 1,000 nm, more preferably from 10 to 200 nm, and most preferably from 10 to 100 nm, to obtain good fixability and high image hardness.

The volume average particle diameter of the resin particles can be measured with a particle size distribution analyzer (NANOTRAC WAVE-UT151 available from MicrotracBEL Corp.).

Preferably, the content rate of the resin in the ink is in the range of from 1% to 30% by mass, more preferably from 5% to 20% by mass, for fixability and storage stability of the ink.

Preferably, solid contents in the ink have a maximum frequency particle diameter in the range of from 20 to 1,000 nm, more preferably from 20 to 150 nm, based on the number of solid contents, for improving discharge stability and image quality (e.g., image density) of the ink. The solid contents include the resin particles and pigment particles. The particle diameter of the solid contents can be measured with a particle size distribution analyzer (NANOTRAC WAVE-UT151 available from MicrotracBEL Corp.).

Mass Ratio of Glycol Ether Compound to Urethane Resin Particles

The mass ratio of the glycol ether compound to the urethane resin particles is preferably in the range of from 0.4 to 2.4, more preferably from 0.4 to 1.8, and most preferably from 1.2 to 1.8. When the mass ratio is from 0.4 to 2.4, it is easy to adjust the maximum value of logarithmic damping ratio and the time elapsed until the logarithmic damping ratio reaches the maximum value to 1.50 or less and 3,800 seconds or less, respectively.

Colorant

Examples of the colorant include, but are not limited to, pigments and dyes.

The pigments include both inorganic pigments and organic pigments. Two or more of the colorants can be used alone or in combination with others. Mixed crystals can also be used as the colorant.

Examples of the pigments include black pigments, yellow pigments, magenta pigments, white pigments, green pigments, orange pigments, glossy color pigments (e.g., gold pigments, silver pigments), and metallic pigments.

Specific examples of the inorganic pigments include, but are not limited to, titanium oxide, iron oxide, calcium carbonate, barium sulfate, aluminum hydroxide, barium yellow, cadmium red, chrome yellow, and carbon black produced by a known method, such as a contact method, a furnace method, and a thermal method.

Specific examples of the organic pigments include, but are not limited to, azo pigments, polycyclic pigments (e.g., phthalocyanine pigments, perylene pigments, perinone pigments, anthraquinone pigments, quinacridone pigments, dioxazine pigments, indigo pigments, thioindigo pigments, isoindolinone pigments, quinophthalone pigments), dye chelates (e.g., basic dye chelate, acid dye chelate), nitro pigments, nitroso pigments, and aniline black. Among these pigments, those having good affinity for the solvent are preferable. In addition, resin hollow particles and inorganic hollow particles can also be used.

Specific examples of the pigments usable for black-and-white printing include, but are not limited to: carbon blacks (i.e., C.I. Pigment Black 7) such as furnace black, lamp black, acetylene black, and channel black; metals such as copper, iron (i.e., C.I. Pigment Black 11), and titanium oxide; and organic pigments such as aniline black (i.e., C.I. Pigment Black 1).

Specific examples of the pigments usable for color printing include, but are not limited to: C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (red iron oxide), 104, 105, 106, 108 (cadmium red), 112, 114, 122 (quinacridone magenta), 123, 146, 149, 166, 168, 170, 172, 177, 178, 179, 184, 185, 190, 193, 202, 207, 208, 209, 213, 219, 224, 254, and 264; C.I. Pigment Violet 1 (rhodamine lake), 3, 5:1, 16, 19, 23, and 38; and C.I. Pigment Green 1, 4, 7, 8, 10, 17, 18, and 36.

Examples of the dyes include acid dyes, direct dyes, reactive dyes, and basic dyes. Two or more of these dyes can be used in combination.

Specific examples of the dyes include, but are not limited to, C.I. Acid Yellow 17, 23, 42, 44, 79, and 142, C.I. Acid Red 52, 80, 82, 249, 254, and 289, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Black 19, 38, 51, 71, 154, 168, 171, and 195, C.I. Reactive Red 14, 32, 55, 79, and 249, and C.I. Reactive Black 3, 4, and 35.

Preferably, the content rate of the colorant in the ink is in the range of from 0.1% to 15% by mass, more preferably from 1% to 10% by mass, for improving image density, fixing strength, and discharge stability.

The pigment can be dispersed in the ink by any of the following methods: introducing a hydrophilic functional group to the pigment to make the pigment self-dispersible; covering the surface of the pigment with a resin; and dispersing the pigment by a dispersant.

In the method of introducing a hydrophilic functional group to the pigment to make the pigment self-dispersible, for example, a functional group such as sulfone group and carboxyl group may be introduced to the pigment (e.g., carbon) to make the pigment dispersible in water.

In the method of covering the surface of the pigment with a resin, for example, the pigment may be incorporated in a microcapsule to make the pigment self-dispersible in water. In this case, the pigment may be referred to as a resin-covered pigment. In this case, not all the pigment particles included in the ink should be covered with a resin. It is possible that a part of the pigment particles are not covered with any resin or partially covered with a resin.

In the method of dispersing the pigment by a dispersant, low-molecular dispersants and high-molecular dispersants, represented by known surfactants, may be used.

More specifically, any of anionic surfactants, cationic surfactants, ampholytic surfactants, and nonionic surfactants may be used as the dispersant depending on the property of the pigment.

For example, a nonionic surfactant RT-100 (product of Takemoto Oil & Fat Co., Ltd.) and sodium naphthalene-sulfonate formalin condensate are preferably used as the dispersant.

One dispersant can be used alone, and two or more dispersants can be used in combination.

Pigment Dispersion

The ink can be obtained by mixing the pigment with other materials such as water and the organic solvent. The ink can also be obtained by, first, preparing a pigment dispersion by mixing the pigment with water, a pigment dispersant, etc., and thereafter mixing the pigment dispersion with other materials such as water and the organic solvent.

The pigment dispersion can be obtained by mixing water, the pigment, a pigment dispersant, and other components, if any. The pigment is dispersed in the pigment dispersion with the adjusted particle diameter. Preferably, the pigment dispersion is prepared with a disperser.

Preferably, the pigment dispersed in the pigment dispersion has a maximum frequency particle diameter in the range of from 20 to 500 nm, more preferably from 20 to 150 nm, based on the number of pigment particles, for improving dispersion stability of the pigment and discharge stability and image quality (e.g., image density) of the ink. The particle diameter of the pigment can be measured with a particle size distribution analyzer (NANOTRAC WAVE-UT151 available from MicrotracBEL Corp.).

Preferably, the content rate of the pigment in the pigment dispersion is in the range of from 0.1% to 50% by mass, more preferably from 0.1% to 30% by mass, for improving discharge stability and image density.

Preferably, the pigment dispersion may be subjected to filtration using a filter or a centrifugal separator to remove coarse particles, and thereafter to degassing.

Water

Preferably, the content rate of water in the ink is in the range of from 10% to 90% by mass, more preferably from 20% to 60% by mass, for drying property and discharge reliability of the ink.

The water may be pure water such as ion-exchange water, ultrafiltration water, reverse osmosis water, and distilled water, or ultrapure water. Each of these waters can be used alone or in combination with others.

Additives

The ink may further contain a surfactant, a defoamer, a preservative, a fungicide, a corrosion inhibitor, and/or a pH adjuster, if necessary.

Surfactant

Usable surfactants include silicone-based surfactants, fluorine-based surfactants, ampholytic surfactants, nonionic surfactants, and anionic surfactants.

The silicone-based surfactants have no specific limit and can be suitably selected to suit to a particular application. Preferred are silicone-based surfactants which are not decomposed even in a high pH environment. Specific examples thereof include, but are not limited to, side-chain-modified polydimethylsiloxane, both-end-modified polydimethylsiloxane, one-end-modified polydimethylsiloxane, and side-chain-both-end-modified polydimethylsiloxane. In particular, those having a polyoxyethylene group and/or a polyoxyethylene polyoxypropylene group as the modifying group are preferable because they demonstrate good characteristics as an aqueous surfactant. Specific examples of the silicone-based surfactants further include polyether-modified silicone-based surfactants, such as a dimethyl siloxane compound having a polyalkylene oxide structure unit on a side chain thereof which is bonded to Si.

Specific preferred examples of the fluorine-based surfactants include, but are not limited to, perfluoroalkyl sulfonic acid compounds, perfluoroalkyl carboxylic acid compounds, perfluoroalkyl phosphate compounds, perfluoroalkyl ethylene oxide adducts, and polyoxyalkylene ether polymer compounds having a perfluoroalkyl ether group on its side chain. These compounds have weak foaming property, which is preferable. Specific examples of the perfluoroalkyl sulfonic acid compounds include, but are not limited to, perfluoroalkyl sulfonic acid and perfluoroalkyl sulfonate. Specific examples of the perfluoroalkyl carboxylic acid compounds include, but are not limited to, perfluoroalkyl carboxylic acid and perfluoroalkyl carboxylate. Specific examples of the polyoxyalkylene ether polymer compounds having a perfluoroalkyl ether group on a side chain include, but are not limited to, a sulfate of a polyoxyalkylene ether polymer having a perfluoroalkyl ether group on its side chain, and a salt of a polyoxyalkylene ether polymer having a perfluoroalkyl ether group on its side chain. Specific examples of the counter ions for these fluorine-based surfactants include, but are not limited to, Li, Na, K, $NH_4$, $NH_3CH_2CH_2OH$, $NH_2(CH_2CH_2OH)_2$, and $NH(CH_2CH_2OH)_3$.

Specific examples of the ampholytic surfactants include, but are not limited to, laurylaminopropionate, lauryl dimethyl betaine, stearyl dimethyl betaine, and lauryl hydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block copolymers, sorbitan fatty acid esters, polyoxyethylene sorbitan fatty acid esters, and ethylene oxide adducts of acetylene alcohol.

Specific examples of the anionic surfactants include, but are not limited to, acetate, dodecylbenzene sulfonate, and laurate of polyoxyethylene alkyl ether, and polyoxyethylene alkyl ether sulfate.

Each of these compounds can be used alone or in combination with others.

Specific examples of the silicone-based surfactants include, but are not limited to, side-chain-modified polydimethylsiloxane, both-end-modified polydimethylsiloxane, one-end-modified polydimethylsiloxane, and side-chain-and-both-end-modified polydimethylsiloxane. More specifically, polyether-modified silicone-based surfactants having polyoxyethylene group and/or polyoxyethylene polyoxypropylene group as the modifying groups are preferable since they exhibit good properties as an aqueous surfactant.

These surfactants are available either synthetically or commercially. Commercial products are readily available from BYK Japan KK, Shin-Etsu Chemical Co., Ltd., Dow Corning Toray Co., Ltd., Nihon Emulsion Co., Ltd., and Kyoeisha Chemical Co., Ltd.

Specific examples of the polyether-modified silicone-based surfactants include, but are not limited to, a compound represented by the following formula (S-1) that is a dimethylpolysiloxane having a polyalkylene oxide structure on its side chain bonded to Si atom.

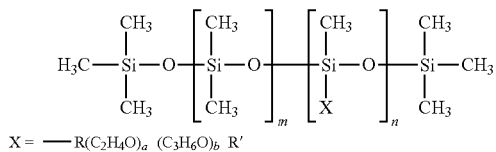

Formula (S-1)

In the formula (S-1), each of m, n, a, and b independently represents an integer, R represents an alkylene group, and R' represents an alkyl group.

Specific examples of commercially-available polyether-modified silicone-based surfactants include, but are not limited to: KF-618, KF-642, and KF-643 (available from Shin-Etsu Chemical Co., Ltd.); EMALEX-SS-5602 and SS-1906EX (available from Nihon Emulsion Co., Ltd.); FZ-2105, FZ-2118, FZ-2154, FZ-2161, FZ-2162, FZ-2163, and FZ-2164 (available from Dow Corning Toray Co., Ltd); BYK-33 and BYK-387 (available from BYK Japan KK); and TSF4440, TSF4452, and TSF4453 (available from Momentive Performance Materials Inc.).

Preferably, the fluorine-based surfactant is a compound having 2 to 16 fluorine-substituted carbon atoms, more preferably a compound having 4 to 16 fluorine-substituted carbon atoms.

Specific examples of the fluorine-based surfactants include, but are not limited to, perfluoroalkyl phosphate compounds, perfluoroalkyl ethylene oxide adducts, and polyoxyalkylene ether polymer compounds having a perfluoroalkyl ether group on its side chain. Among these fluorine-based surfactants, polyoxyalkylene ether polymer compounds having a perfluoroalkyl ether group on its side chain are preferable since foaming property thereof is small. More specifically, compounds represented by the following formula (F-1) and (F-2) are preferable.

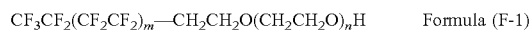

Formula (F-1)

In the formula (F-1), m is preferably an integer ranging from 0 to 10, and n is preferably an integer ranging from 0 to 40, to give water-solubility to the compound.

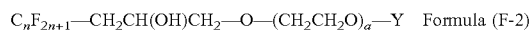

Formula (F-2)

In the formula (F-2), Y represents H, $C_nF_{2n+1}$ (where n represents an integer of from 1 to 6), $CH_2CH(OH)CH_2—C_nF_{2n+1}$ (where n represents an integer of from 4 to 6), or $C_pF_{2p+1}$ (where p represents an integer of from 1 to 19); and a represents an integer of from 4 to 14.

The fluorine-based surfactants are available either synthetically or commercially.

Specific examples of commercially-available fluorine-based surfactants include, but are not limited to: SURFLON S-111, S-112, S-113, S-121, S-131, S-132, S-141, and S-145 (available from Asahi Glass Co., Ltd.); Fluorad™ FC-93, FC-95, FC-98, FC-129, FC-135, FC-170C, FC-430, and FC-431 (available from Sumitomo 3M Limited); MEGAFACE F-470, F-1405, and F-474 (available from DIC Corporation); Zonyl® TBS, FSP, FSA, FSN-100, FSN, FSO-100, FSO, FS-300, UR, CAPSTONE FS-30, FS-31, FS-3100, FS-34, and FS-35 (available from The Chemours Company); FT-110, FT-250, FT-251, FT-400S, FT-150, and FT-400SW (available from NEOS COMPANY LIMITED); PolyFox PF-136A, PF-156A, PF-151N, PF-154, and PF-159 (available from OMNOVA Solutions Inc.); and UNIDYNE™ DSN-403N (available from Daikin Industries, Ltd.). Among these, for improving printing quality, in particular color developing property, paper permeability, paper wettability, and uniform dying property, FS-3100, FS-34, and FS-300 (available from The Chemours Company), FT-110, FT-250, FT-251, FT-400S, FT-150, and FT-400SW (available from NEOS COMPANY LIMITED), PolyFox PF-151N (available from OMNOVA Solutions Inc.), and UNIDYNE™ DSN-403N (available from Daikin Industries, Ltd.) are particularly preferred.

Preferably, the content rate of the surfactant in the ink is in the range of from 0.001% to 5% by mass, more preferably from 0.05% to 5% by mass, for improving wettability, discharge stability, and image quality.

Defoamer

Specific examples of the defoamer include, but are not limited to, silicone defoamers, polyether defoamers, and fatty acid ester defoamers. Two or more of these defoamers can be used alone or in combination with others. Among these defoamers, silicone defoamers are preferable since they have excellent defoaming ability.

Preservative and Fungicide

Specific examples of the preservative and fungicide include, but are not limited to, 1,2-benzisothiazoline-3-one.

Corrosion Inhibitor

Specific examples of the corrosion inhibitor include, but are not limited to, acid sulphite and sodium thiosulfate.

pH Adjuster

The pH adjuster has no particular limit so long as it is capable of adjusting the pH to 7 or higher. Specific examples of such a pH adjuster include, but are not limited to, amines such as diethanolamine and triethanolamine.

The properties of the ink, such as viscosity, surface tension, and pH, are not particularly limited and can be suitably selected to suit to a particular application.

Preferably, the ink has a viscosity at 25° C. in the range of from 5 to 30 mPa·s, more preferably from 5 to 25 mPa·s, for improving print density and text quality and obtaining good dischargibility. The viscosity can be measured at 25° C. by a rotatory viscometer (RE-80 L available from Toki Sangyo Co., Ltd.) equipped with a standard cone rotor (1°34'×R24), while setting the sample liquid amount to 1.2 mL, the number of rotations to 50 rotations per minute (rpm), and the measuring time to 3 minutes.

Preferably, the ink has a surface tension of 35 mN/m or less, more preferably 32 mN/m or less, at 25° C., so that the ink is suitably levelized on a recording medium and the drying time of the ink is shortened.

Preferably, the ink has a pH in the range of from 7 to 12, more preferably from 8 to 11, for preventing corrosion of metal materials contacting the ink.

Recording Medium

Specific examples of the recording medium include, but are not limited to, plain paper, glossy paper, special paper, clothes, film, overhead projector (OHP) transparency, and general-purpose printing paper.

In particular, the recording medium preferably comprises a substrate and a coating layer disposed on at least one surface of the substrate, and optionally includes other layers, if needed.

Such a recording medium comprising a substrate and a coating layer is generally called coated paper and known to have low ink permeability. It is generally difficult to strongly fix a colorant on such a recording medium having low permeability, such as coated paper, and thus the resulting image becomes poor in abrasion resistance. On the other hand, when the maximum value of logarithmic damping ratio of the ink film is 1.50 or less and the time elapsed until the logarithmic damping ratio reaches the maximum value is 3,800 seconds or less, when measured by a rigid-body pendulum test at 60° C., the image causes no blocking even when a pressure of from 3.5 to 8.0 kg/m$^2$ is applied thereto while exhibiting high glossiness.

In a case in which the recording medium comprises a substrate and a coating layer, preferably, the transfer amount of pure water to the recording medium within a contact time of 100 ms is from 2 to 35 mL/m$^2$, more preferably from 2 to 10 mL/m$^2$, when measured by a dynamic scanning absorptometer.

When the transfer amount of pure water within a contact time of 100 ms is too small, beading (i.e., a phenomenon in which adjacent dots attract each other to make the image surface rough) may easily occur. When the transfer amount of pure water within a contact time of 100 ms is too large, the ink dot diameter in the image becomes too smaller than a desired diameter.

In addition, preferably, the transfer amount of pure water to the recording medium within a contact time of 400 ms is from 3 to 40 mL/m$^2$, more preferably from 3 to 10 mL/m$^2$, when measured by a dynamic scanning absorptometer.

When the transfer amount of pure water within a contact time of 400 ms is too small, drying property of the image is so poor that spur roller mark is easily made. When the transfer amount of pure water within a contact time of 400 ms is too large, glossiness of the dried image becomes too low. The transfer amount of pure water within a contact time of 100 ms or 400 ms is measured at the surface of the recording medium which has a coating layer thereon.

The dynamic scanning absorptometer ("DSA") is an instrument capable of accurately measuring the amount of liquid absorption within an extremely short time period, as disclosed in a paper entitled "Development and application of dynamic scanning absorptometer—Automation and improvement of Bristow measurement—", Shigenori Kuga, Japan Tappi Journal, Volume 48, 1994, No. 5, pp. 730-734. The dynamic scanning absorptometer provides an automated measurement that involves directly measuring the rate of liquid absorption by tracking the motion of meniscus in a capillary, spirally scanning a liquid supply head on a disc-shaped specimen, and automatically varying the scanning speed according to the preset pattern to perform the measurement required number of times using a single specimen.

The liquid supply head for supplying a liquid to a paper specimen is connected to the capillary via a Teflon (registered trademark) tube. The position of meniscus is automatically tracked by an optical sensor. In particular, the transfer amount of pure water or ink may be measured by a dynamic scanning absorptometer K350 series D type (available from Kyowa Co., Ltd.).

The transfer amount within a contact time period of 100 ms or 400 ms is determined by interpolating the transfer amounts measured within contact time periods near 100 ms or 400 ms.

Substrate

Examples of the substrate include, but are not limited to, sheet-like materials such as wood-fiber-based paper and wood-fiber-and-synthetic-fiber-based unwoven fabric.

The paper may be made from, for example, wood pulp or used paper pulp.

Specific examples of the wood pulp include, but are not limited to, Laubholz bleached kraft pulp (LBKP), Nadelholz bleached kraft pulp (NBKP), NBSP, LBSP, GP, and TMP.

Raw materials of the used paper pulp include those listed in the material entitled "Quality Classification of Used Paper" issued by Paper Recycling Promotion Center (i.e., a public interest incorporated foundation), such as JYOUHAKU, KEIHAKU, CREAM HAKU, CARD, TOKUHAKU, CHUUHAKU, MOZOU, IROJYOU, KENT, HAKU ART, TOKUJYOUGIRI, BETSUJYOUGIRI, SHINBUN, and ZASSHI.

More specifically, raw materials of the used paper pulp include used paper or paperboard of printer papers (i.e., data processing papers) such as non-coated computer paper, heat-sensitive paper, and pressure-sensitive paper; office waste papers such as PPC (plain paper copier) paper; coated papers such as art paper, coat paper, fine coating paper, and mat paper; non-coated papers such as high quality (or wood free) paper, high quality (or wood free) colored paper, notebook, letter paper, wrapping paper, fancy paper, medium quality (or wood-containing) paper, newsprint paper, groundwood paper, super wrapping paper, simili paper, pure white rolled paper sheet, and milk carton. Examples of the paper made from such pulps include, but are not limited to, chemical pulp paper and high-yield pulp-containing paper.

Each of these materials can be used alone or in combination with others.

The used paper pulp is generally manufactured by combining the following four processes.

(1) Detaching process in which used paper is loosened into fibers with a mechanical force and a chemical treatment by a pulper so that printing ink is detached from the fibers.

(2) Dust removing process in which foreign substances (e.g., plastics) and dirt contained in the used paper are removed by a screen or cleaner.

(3) Deinking process in which the printing ink detached from the fibers with a surfactant is removed by a flotation method or a washing method.

(4) Bleaching process in which the degree of whiteness of the fibers is enhanced by an oxidation or reduction effect.

In a case in which the used paper pulp is mixed with other pulps, the mixing ratio of the used paper pulp to the total pulp is preferably 40% or less for preventing the resulting paper from curling after an image is formed thereon.

The substrate may contain a filler. Examples of the filler include white pigments.

Specific examples of the white pigments include, but are not limited to: white inorganic pigments such as precipitated calcium carbonate, ground calcium carbonate, kaolin, clay, talc, calcium sulfate, barium sulfate, titanium dioxide, zinc oxide, zinc sulfide, zinc carbonate, satin white, aluminum silicate, diatom earth, calcium silicate, magnesium silicate, synthetic silica, aluminum hydroxide, alumina, lithopone, zeolite, magnesium carbonate, and magnesium hydroxide; and organic pigments such as styrene-based plastic pigments, acrylic plastic pigments, polyethylene, microcapsule, urea resin, and melamine resin. Each of these pigments can be used alone or in combination with others.

When the substrate is formed into paper sheet, a sizing agent is internally added thereto. Examples of the sizing agent for neutral paper-making include, but are not limited to, neutral rosin-based sizing agents, alkenyl succinic anhydrides (ASA), alkyl ketene dimers (AKD), and petroleum-resin-based sizing agents. Among these, neutral rosin-based sizing agents and alkenyl succinic anhydrides are preferable. The alkyl ketene dimers can exhibit high sizing effect in a small amount.

Coating Layer

The coating layer contains a pigment and a binder, and optionally contains a surfactant and other components, as necessary. In the present disclosure, the coating layer is not necessarily formed by means of coating. How to form the coating layer is not limited so long as the resultant coating layer contains a pigment and a binder.

Examples of the pigment include inorganic pigments and combinations of inorganic and organic pigments.

Specific examples of the inorganic pigments include, but are not limited to, kaolin, talc, ground calcium carbonate, precipitated calcium carbonate, calcium sulfite, amorphous silica, titanium white, magnesium carbonate, titanium dioxide, aluminum hydroxide, calcium hydroxide, magnesium hydroxide, zinc hydroxide, and chlorite. Among these pigments, kaolin is preferred since it has high gloss developing property and thus provides similar texture to offset printing paper.

Examples of the kaolin include delaminated kaolin, calcined kaolin, and engineered kaolin (e.g., surface-modified kaolin). Preferably, 50% by mass or more of the total kaolin comprises kaolin particles having a particle size distribution such that a particle diameter of 2 μm or less accounts for 80%, for gloss developing property.

Preferably, the content of the kaolin is 50 parts by mass or more based on 100 parts by mass of the binder. When the content is 50 parts by mass or more, glossiness is improved. There is no upper limit for the content of the kaolin. For improving coating property, the content of kaolin is preferably 90 parts at most, considering fluidity of kaolin, particularly thickening property under high shearing force.

Specific examples of the organic pigments include, but are not limited to, water-soluble dispersions of styrene-acrylic copolymer particles, styrene-butadiene copolymer particles, polystyrene particles, and polyethylene particles. Two or more of the organic pigments can be used in combination.

Preferably, the content of the organic pigment is 2 to 20 parts by mass based on 100 parts by mass of the total pigments in the coating layer. The organic pigment is bulky and highly glossy for its excellent gloss developing property and smaller specific weight than the inorganic pigments. Therefore, the organic pigment can provide a coating layer having high gloss and surface coating property. When the content is 2 parts by mass or more, the above effect is more improved. When the content is 20 parts by mass or less, the coating liquid exhibits excellent fluidity, which improves coating operability while reducing cost.

The organic pigment may be in the form of a dense solid, hallow, or donut. For achieving a good balance between gloss developing property, surface coating property, and fluidity of the coating liquid, preferably, the organic pigment has an average particle diameter of from 0.2 to 3.0 μm and has a hollow shape having a void area ratio of 40% or more.

Preferably, the binder comprises a water-based resin.

The water-based resin includes both water-soluble resins and water-dispersible resins.

Specific examples of the water-soluble resins include, but are not limited to: polyvinyl alcohol and modified products thereof, such as anion-modified polyvinyl alcohol, cation-modified polyvinyl alcohol, and acetal-modified polyvinyl alcohol; polyurethane; polyvinyl pyrrolidone and modified products thereof, such as copolymer of polyvinyl pyrrolidone and vinyl acetate, copolymer of vinyl pyrrolidone and dimethylaminoethyl methacrylic acid, copolymer of quaternized vinyl pyrrolidone and dimethylaminoethyl methacrylic acid, and copolymer of vinyl pyrrolidone and methacrylamide propyl trimethyl ammonium chloride; celluloses such as carboxymethyl cellulose, hydroxyethyl cellulose, and hydroxypropyl cellulose; modified celluloses such as cationized hydroxyethyl cellulose; synthetic resins such as polyester, polyacrylic acid, polyacrylate, melamine resin, and modified products thereof, and copolymer of polyester and polyurethane; polyacrylic acid and polymethacrylic acid; polyacrylamide and polymethacrylamide; modified starches such as oxidized starch, phosphoric-acid-esterified starch, self-modified starch, and cationized starch; polyethylene oxides; and sodium polyacrylate and sodium alginate. Each of these resins can be used alone or in combination with others.

Among these resins, polyvinyl alcohol, cation-modified polyvinyl alcohol, acetal-modified polyvinyl alcohol, polyester, polyurethane, and copolymer of polyester and polyurethane are preferable for ink absorptivity.

Specific examples of the water-dispersible resins include, but are not limited to, polyvinyl acetate, ethylene-vinyl acetate copolymer, polystyrene, copolymer of styrene with acrylate or methacrylate, acrylate or methacrylate polymer, copolymer of vinyl acetate with acrylic acid, methacrylic acid, acrylate, or methacrylate, styrene-butadiene copolymer, ethylene-propylene copolymer, polyvinyl ether, and silicone-acrylic copolymer. In addition, the water-dispersible resin may contain a cross-linker, such as methylol melamine, methylol urea, methylol hydroxypropylene urea, and isocyanate. Alternatively, the water-dispersible resin may be a self-cross-linkable copolymer having an N-methylol acrylamide unit. Each of these water-dispersible resins can be used alone or in combination with others.

The content of the water-dispersible resin is preferably in the range of from 2 to 100 parts by mass, more preferably from 3 to 50 parts by mass, based on 100 parts by mass of the pigment. The content is determined so that the liquid absorption property of the recording medium falls into the above-specified range.

The coating layer may contain a cationic organic compound. Examples of the cationic organic compound include monomers, oligomers, and polymers of primary, secondary, and tertiary amines and quaternary ammonium salts that react with sulfonic acid group, carboxyl group, amino group, etc. in a direct dye or acid dye contained in the ink.

Specific examples of the cationic organic compound include, but are not limited to, dimethyl amine-epichlorohydrin polycondensate, dimethylamine-ammonia-epichlorohydrin condensate, poly(trimethylaminoethyl methacrylate-methyl sulfate), diallylamine hydrochloride-acrylamide copolymer, poly(diallylamine hydrochloride-sulfur dioxide), polyallylamine hydrochloride, poly(allylamine hydrochloride-diallylamine hydrochloride), acrylamide-diallylamine copolymer, polyvinylamine copolymer, dicyandiamide, dicyandiamide-ammonium chloride-urea-formaldehyde condensate, polyalkylenepolyamine-dicyandiamide ammonium salt condensate, dimethyldiallylammonium chloride, polydiallylmethylamine hydrochloride, poly(diallyldimethyl ammonium chloride), poly(diallyldimethyl ammonium chloride-sulfur dioxide), poly(diallyldimethylammonium chloride-diallylamine hydrochloride derivative), acrylamide-diallyldimethylammonium chloride copolymer, acrylate-acrylamide-diallylamine hydrochloride copolymer, polyethyleneimine, ethyleneimine derivatives such as acrylamine polymer, and alkylene-oxide-modified polyethyleneimine. Each of these compounds can be used alone or in combination with others.

In particular, combination use of a low-molecular-weight cationic organic compound, such as dimethylamine-epichlorohydrin polycondensate and polyarylamine hydrochloride, with a relatively-high-molecular-weight cationic organic compound, such as poly(diallyldimethylammonium chloride), is preferable. The combination use more improves image density and suppresses feathering compared to sole use.

Preferably, the cationic organic compound has a cation equivalent of from 3 to 8 meq/g, when measured by a colloid titration method (using potassium polyvinyl sulfate and tolidine blue). When the cation equivalent is within the above range, good results will be obtained as long as the deposition amount of the cationic organic compound after being dried is within the preferred range described later.

In measuring cation equivalent by the colloid titration method, the cationic organic compound is diluted with purified water so that solid content concentration becomes 0.1% by mass without adjusting pH.

Preferably, the deposition amount of the cationic organic compound after being dried is from 0.3 to 2.0 $g/m^2$. When the deposition amount of the cationic organic compound after being dried is from 0.3 to 2.0 $g/m^2$, image density is more improved and feathering is more suppressed.

Examples of the surfactant include anionic surfactants, cationic surfactants, ampholytic surfactants, and nonionic surfactants. Among these, nonionic surfactants are preferable. As the surfactant is contained in the coating layer, water resistance and density of the image are improved and bleeding is suppressed.

Specific examples of the nonionic surfactants include, but are not limited to, ethylene oxide adducts of higher alcohols, ethylene oxide adducts of alkyl phenols, ethylene oxide adducts of fatty acids, ethylene oxide adducts of polyol fatty acid esters, ethylene oxide adducts of higher aliphatic amines, ethylene oxide adducts of fatty acid amides, ethylene oxide adducts of oils and fats, ethylene oxide adducts of polypropylene glycol, fatty acid esters of glycerol, fatty acid esters of pentaerythritol, fatty acid esters of sorbitol or sorbitan, fatty acid esters of sucrose, alkyl ethers of polyols, and fatty acid amides of alkanolamines. Each of these compounds can be used alone or in combination with others.

Specific examples of the polyols include, but are not limited to, glycerol, trimethylolpropane, pentaerythritol, sorbitol, and sucrose.

With respect to the ethylene oxide adducts, a part of the ethylene oxides may be replaced with other alkylene oxides such as propylene oxide and butylene oxide so long as water-solubility is maintained. In this case, preferably, the replacement ratio is 50% or less.

The HLB (Hydrophilic-Lipophilic Balance) of the nonionic surfactant is preferably from 4 to 15, more preferably from 7 to 13.

The addition amount of the surfactant is preferably from 0 to 10 parts by mass, more preferably from 0.1 to 1.0 parts by mass, based on 100 parts by mass of the cationic organic compound.

The coating layer may further contain other components without compromising the effect thereof. Examples of other components include, but are not limited to, additives such as alumina powder, pH adjuster, preservative, and antioxidant.

There is no limit on how to form the coating layer. For example, the coating layer may be formed by impregnating or coating the substrate with the coating liquid. The substrate may be impregnated or coated with the coating liquid by a coater such as conventional size press, gate roll size press, film transfer size press, blade coater, rod coater, air knife coater, and curtain coater. For reducing cost, the substrate may be first impregnated or coated with the coating liquid by a conventional size press, gate roll size press, or film transfer size press installed in a paper machine, and finished on-machine.

The deposition amount of the coating liquid is preferably from 0.5 to 20 $g/m^2$, more preferably from 1 to 15 $g/m^2$, based on solid contents.

The substrate impregnated or coated with the coating liquid may be subject to drying, if needed. The drying temperature is preferably from 100° C. to 250° C., but is not limited thereto.

The recording medium may further comprise a back layer on the back side of the substrate, a layer between the substrate and the coating or back layer, and/or a protective layer on the coating layer. Each of these layers may be either single-layered or multi-layered.

Pressurizing Process and Pressurizer

The pressurizing process is a process in which a pressure is applied to the recording medium to which the ink has been applied in the first ink applying process.

The pressurizer is configured to apply a pressure to the recording medium to which the ink has been applied by the first ink applier.

The pressurizing process is preferably performed by the pressurizer.

Preferably, in the pressurizing process, the pressure is generated as the continuous sheet to which the ink has been applied is wound in a roll.

In addition to such a case in which the continuous sheet is stacked in layers, the pressure may be generated as cut sheets are stacked in layers or the continuous or cut sheet is cut. The pressure may also be applied to the sheet from a fixing roller for fixing the image and an application roller for applying an aftertreatment liquid to the image.

Second Ink Applying Process and Second Ink Applier

The second ink applying process is a process in which an ink is applied to the continuous sheet to form another image after the pressurizing process.

The second ink applier is configured to apply an ink to the continuous sheet to form another image after the pressurizing process.

The second ink applying process is preferably performed by the second ink applier.

Method for Manufacturing Printed Matter

In accordance with some embodiments of the present invention, a method for manufacturing printed matter is provided that includes the steps of: (a) applying an ink to a recording medium to form an image (hereinafter "first ink applying process"); and (b) applying a pressure to the recording medium to which the ink has been applied (hereinafter "pressurizing process"). The ink comprises water, an organic solvent, and a colorant. When the ink is formed into an ink film, a maximum value of logarithmic damping ratio of the ink film is 1.50 or less and a time elapsed until the logarithmic damping ratio reaches the maximum value is 3,800 seconds or less, when measured by a rigid-body pendulum test at 60° C. The pressure may be in the range of from 3.5 to 8.0 kg/cm$^2$. The pressure may be generated as the recording medium to which the ink has been applied is wound in a roll.

The first ink applying process may be the same as the first ink applying process in the above-described image forming method.

The pressurizing process may be the same as the pressurizing process in the above-described image forming method.

Hereinafter, the image forming method, image forming apparatus, image forming system, and method for manufacturing printed matter in accordance with some embodiments of the present invention are described with reference to the drawings. In the present disclosure, the image forming system is defined as a concept including multiple apparatuses when each constitutional elements of the invention exists in each of the multiple apparatuses or extends over some of the multiple apparatuses. For example, the concept includes a case in which the first ink applier and the pressurizer exist in separate apparatuses. In the present disclosure, the continuous sheet is defined as a recording medium that is continuous in the direction of conveyance in image formation.

Examples of the continuous sheet include rolled sheet (rolled in a roll form) and folded sheet (folded at predetermined interval). Incidentally, it is to be noted that the following embodiments are not limiting the present disclosure and any deletion, addition, modification, change, etc. can be made within a scope in which man in the art can conceive including other embodiments, and any of which is included within the scope of the present disclosure as long as the effect and feature of the present disclosure are demonstrated.

Figure 3:
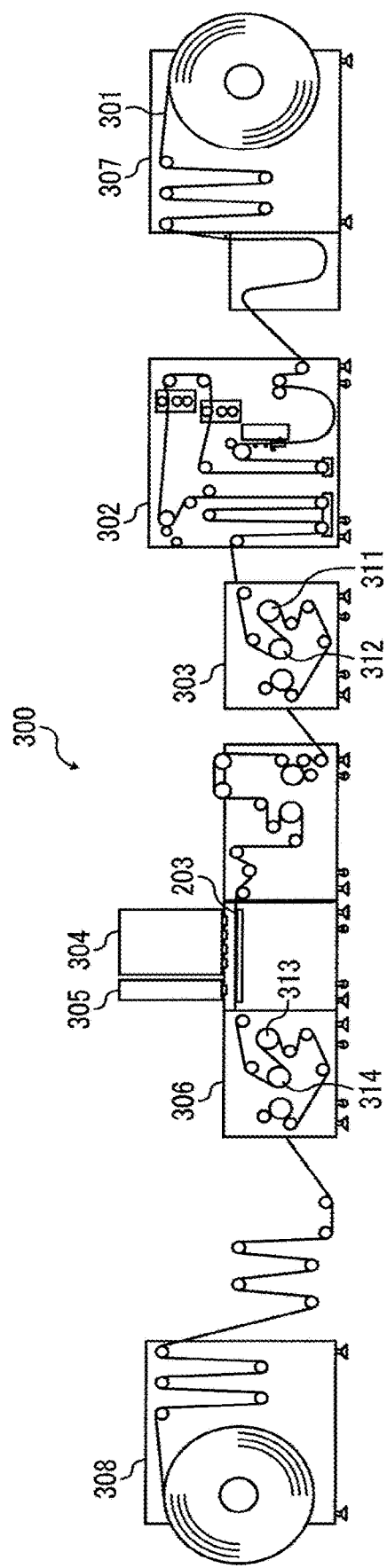
FIG. 3 is a schematic view of an image forming apparatus in accordance with some embodiments of the present invention that is an inkjet recording apparatus.

FIG. 3 is a schematic view of an image forming apparatus in accordance with some embodiments of the present invention, which is an inkjet recording apparatus. An inkjet recording apparatus 300 includes a recording medium conveyer 301, a pretreatment unit 302 to apply a pretreatment liquid to a recording medium 203, a post-pretreatment dryer 303 to dry the recording medium 203 to which the pretreatment liquid has been applied, an image forming unit 304, an aftertreatment unit 305 to apply an aftertreatment liquid to the recording medium 203 on which an image has been formed, and a post-aftertreatment dryer 306 to dry the recording medium 203 to which the aftertreatment liquid has been applied.

The recording medium conveyer 301 includes a sheet feeder 307, multiple conveyance rollers, and a winder 308. The recording medium 203 is a continuous sheet wound in a roll (i.e., rolled sheet). The recording medium 203 is wound off from the sheet feeder 307 by the conveyance roller, conveyed on a platen, and wound up by the winder 308.

In the pretreatment unit 302, a pretreatment liquid is applied to the recording medium 203 conveyed by the recording medium conveyer 301. Generally, if a recording medium non-exclusively for inkjet printing is used for inkjet image forming apparatus, various problems regarding image quality (e.g., blurring, density, color tone, bleed-through) or image toughness (e.g., water resistance, fade resistance) will arise. To solve these problems and improve image quality, the pretreatment liquid having a function of aggregating ink is previously applied to the recording medium before an image is formed thereon.

In the pretreatment unit 302, the pretreatment liquid is uniformly applied to the surface of the recording medium 203 by any known application method. Specific examples of the application method include, but are not limited to, blade coating, gravure coating, gravure offset coating, bar coating, roll coating, knife coating, air knife coating, comma coating, U comma coating, AKKU coating, smoothing coating, micro gravure coating, reverse roll coating, 4-roll or 5-roll coating, dip coating, curtain coating, slide coating, and die coating.

The post-pretreatment dryer 303 is disposed downstream from the pretreatment unit 302. The post-pretreatment dryer 303 includes heat rollers 311 and 312. The recording medium 203 to which the pretreatment liquid has been applied is conveyed to the heat rollers 311 and 312 by conveyance rollers. The heat rollers 311 and 312 are heated to a high temperature of from 50° C. to 100° C. Thus, as the recording medium 203 to which the pretreatment liquid has been applied contacts the heat rollers 311 and 312, moisture is evaporated from the recording medium 203 by transmission of heat, thus drying the recording medium 203.

Figure 4:
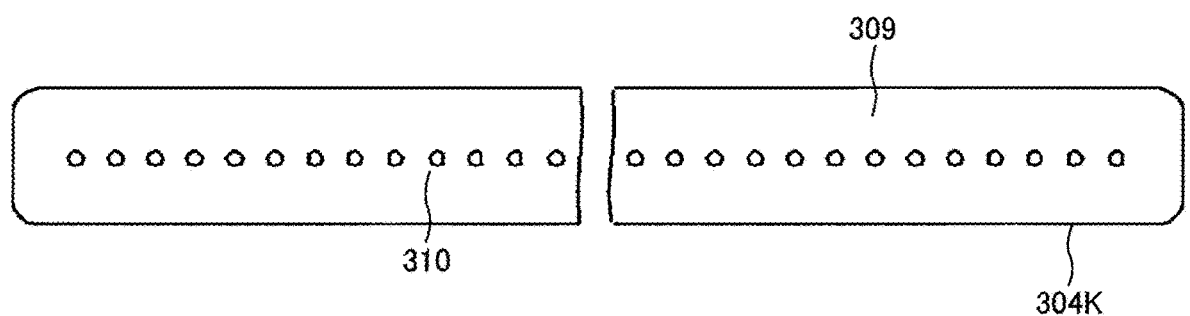
FIG. 4 is a magnified view of a recording head included in the image forming apparatus illustrated in FIG. 3.

FIG. 4 is a magnified view of a recording head 304K included in the image forming unit 304 illustrated in FIG. 3. The recording head 304K has a nozzle surface 309 on which multiple printing nozzles 310 are arranged in the longitudinal direction of the recording head 304K to form a nozzle array. In the present embodiment, only one nozzle array is provided for an illustrative purpose. The number of nozzle arrays is not limited to one. The image forming unit 304 includes four recording heads 304K, 304C, 304M, and 304Y Each of the recording heads 304C, 304M, and 304Y has the same configuration as the recording head 304K. The four recording heads 304K, 304C, 304M, and 304Y are arranged at regular intervals in the direction of conveyance of the recording medium 203. This configuration makes it possible to form an image over the entire printing area through one time of printing operation.

In the aftertreatment unit 305 disposed downstream from the image forming unit 304, an aftertreatment liquid is applied to the recording medium 203. The aftertreatment liquid contains a component capable of forming a transparent protective layer on the recording medium 203.

In the aftertreatment unit 305, the aftertreatment liquid is applied only to a specific part of the image forming region on the recording medium 203. Preferably, the application amount of the aftertreatment liquid is adjusted depending on the color of the ink forming an image. More preferably, the application amount and application method of the aftertreatment liquid are varied depending on the type of recording medium and image resolution.

There is no particular limitation on the method of applying the aftertreatment liquid, and various methods are appropriately selected depending the type of the aftertreatment liquid. Preferably, the above-described method of applying the pretreatment liquid or jetting ink is used for applying the aftertreatment liquid. From the viewpoint of apparatus configuration and storage stability of the aftertreatment liquid, the method of jetting ink is more preferably used therefor. The aftertreatment process is a process in which the aftertreatment liquid containing a transparent resin is applied to the surface of the image to form a protective layer such that the deposition amount of the aftertreatment liquid when being dried becomes in the range of from 0.5 to 10 g/m².

The post-aftertreatment dryer 306 includes heat rollers 313 and 314. The recording medium 203 to which the aftertreatment liquid has been applied is conveyed to the heat rollers 313 and 314 by conveyance rollers. The heat rollers 313 and 314 are heated to a high temperature. Thus, as the recording medium 203 to which the aftertreatment liquid has been applied contacts the heat rollers 313 and 313, moisture is evaporated from the recording medium 203 by transmission of heat, thus drying the recording medium 203. The configuration of the post-aftertreatment dryer 306 is not limited to the above-described configuration. The post-aftertreatment dryer 306 may include an infrared dryer, microwave dryer, hot air device, or combination thereof (e.g., combination of a heat roller and a hot air device).

EXAMPLES

Further understanding can be obtained by reference to certain specific examples which are provided herein for the purpose of illustration only and are not intended to be limiting.

In the following Examples and Comparative Examples, the maximum value of logarithmic damping ratio and the time elapsed until the logarithmic damping ratio reaches the maximum value were measured as follows.
Maximum Value of Logarithmic Damping Ratio/Time Elapsed Until Logarithmic Damping Ratio Reaches Maximum Value The maximum value of logarithmic damping ratio and the time elapsed until the logarithmic damping ratio reaches the maximum value were measured with a Rigid-body Pendulum Type Physical Properties Testing Instrument RPT-3000W (available from A&D Company, Limited).

Specifically, an ink film was formed by dropping 40 μL of the ink onto an aluminum substrate and forming the dropped ink into a film having a thickness of 100 μm using a coating jig (PCT-100). The ink film was immediately set along with a cold block (CHB-100). A cylinder edge (RBP-040) and a pendulum (FRB-100) were set up, and two weights exclusive for FRB-100 were set at the lowest part of the pendulum. The measurement temperature was raised from normal temperature (25° C.) to 60° C. at a rate of 5° C./min and kept at 60° C. thereafter. The logarithmic damping ratio and temperature were plotted along the time. The obtained curve was smoothened and the maximum value thereof was calculated as the maximum value of logarithmic damping ratio.

A logarithmic damping ratio (D'(n)) after the smoothing was determined from the following formulae, where D(n) representing logarithmic damping ratio of the $n^{th}$ plot.

$$D'(n)=\{D(n-2)+D(n-1)+D(n)+D(n+1)+D(n+2)\}/5$$

$$D'(1)=D(1)$$

$$D'(2)=\{D(1)+D(2)\}/2$$

Polyurethane Resin Particle Dispersion Liquid Preparation Example 1
Preparation of Polyurethane Resin Particle Dispersion Liquid 1

In a reaction vessel equipped with a cooling tube, a stirrer, and a nitrogen inlet tube, 1,6-hexanediol and 1,6-hexanedioic acid were poured so that the ratio OH/COOH became 1.5, along with titanium tetraisopropoxide in an amount 1,000 ppm (1% by mass) based on resin components. The temperature was thereafter raised to 200° C. over a period of 4 hours. The temperature was further raised to 230° C. over a period of 2 hours. The reaction was continued until no water outflowed. The reaction was further continued under reduced pressures of from 1,334 to 2,000 Pa (i.e., 10 to 15 mmHg) for 5 hours. Thus, an intermediate polyester was obtained.

Next, in a reaction vessel equipped with a cooling tube, a stirrer, and a nitrogen inlet tube, the intermediate polyester and isophorone diisocyanate were poured so that the molar ratio became 2.0, diluted with ethyl acetate so that the concentration became 48% by mass, and reacted at 100° C. for 5 hours. A large amount of water was further poured in the vessel and the solvent was removed. Thus, a polyurethane resin particle dispersion liquid 1 having a solid content concentration of 10% by mass was prepared.
Polyurethane Resin Particle Dispersion Liquid Preparation Example 2
Preparation of Polyurethane Resin Particle Dispersion Liquid 2

The procedure in Polyurethane Resin Particle Dispersion Liquid Preparation Example 1 was repeated except for replacing the 1,6-hexanediol with 1,4-butanediol. Thus, a polyurethane resin particle dispersion liquid 2 having a solid content concentration of 10% by mass was prepared.
Polyurethane Resin Particle Dispersion Liquid Preparation Example 3
Preparation of Polyurethane Resin Particle Dispersion Liquid 3

The procedure in Polyurethane Resin Particle Dispersion Liquid Preparation Example 1 was repeated except for replacing the 1,6-hexanedioic acid with 1,4-butanedioic acid. Thus, a polyurethane resin particle dispersion liquid 3 having a solid content concentration of 10% by mass was prepared.
Ink Preparation Example 1
Preparation of Ink 1

An ink 1 was prepared by stir-mixing 5.0% by mass of a magenta pigment (Pigment Red 122 available from Dainichiseika Color & Chemicals Mfg. Co., Ltd.), 4.0% by mass of tripropylene glycol monobutyl ether (available from Dow Chemical Japan Limited), 5.0% by mass of triethylene glycol dimethyl ether (available from Dow Chemical Japan Limited), 25.0% by mass of 1,2-propanediol (also known as propylene glycol, available from Kanto Chemical Co., Inc.), 50.0% by mass of the polyurethane resin particle dispersion liquid 1 (having a solid content concentration of 10% by mass), and ultrapure water in a residual amount such that the total percentage became 100% by mass. Thus, an ink 1 was prepared.

Ink Preparation Examples 2 to 20
Preparation of Inks 2 to 20

The procedure in Ink Preparation Example 1 was repeated except for changing the composition according to the formulations described in Tables 1 to 3. Thus, inks 2 to 20 were prepared.

TABLE 1

| | | Ink | | | | | | |
|---|---|---|---|---|---|---|---|---|
| | | 1 | 2 | 3 | 4 | 5 | 6 | 7 |
| Colorant | Magenta pigment | 5.0 | 5.0 | 5.0 | 5.0 | 5.0 | 5.0 | 5.0 |
| | Yellow pigment | — | — | — | — | — | — | — |
| Organic Solvent | Tripropylene glycol monobutyl ether | 4.0 | 4.0 | 4.0 | 4.0 | 4.0 | 4.0 | 4.0 |
| | Triethylene glycol dimethyl ether | 5.0 | — | — | — | 5.0 | — | — |
| | Diethylene glycol diethyl ether | — | 5.0 | — | — | — | 5.0 | — |
| | Dipropylene glycol dimethyl ether | — | — | 5.0 | — | — | — | 5.0 |
| | Tripropylene glycol dimethyl ether | — | — | — | 5.0 | — | — | — |
| | 1,2-Propanediol | 25.0 | 25.0 | 25.0 | 25.0 | 25.0 | 25.0 | 25.0 |
| Resin | Polyurethane resin particle dispersion liquid 1 | 50.0 | 50.0 | 50.0 | 50.0 | — | — | — |
| | Polyurethane resin particle dispersion liquid 2 | — | — | — | — | 50.0 | 50.0 | 50.0 |
| | Polyurethane resin particle dispersion liquid 3 | — | — | — | — | — | — | — |
| Water | Ultrapure water | Residual Amount | Residual Amount | Residual Amount | Residual Amount | Residual Amount | Residual Amount | Residual Amount |
| Total (% by mass) | | 100 | 100 | 100 | 100 | 100 | 100 | 100 |
| Mass Ratio (Glycol ether compound/Urethane resin particles) | | 1.8 | 1.8 | 1.8 | 1.8 | 1.8 | 1.8 | 1.8 |

TABLE 2

| | | Ink | | | | | | |
|---|---|---|---|---|---|---|---|---|
| | | 8 | 9 | 10 | 11 | 12 | 13 | 14 |
| Colorant | Magenta pigment | 5.0 | 5.0 | 5.0 | 5.0 | 5.0 | 5.0 | 5.0 |
| | Yellow pigment | — | — | — | — | — | — | — |
| Organic Solvent | Tripropylene glycol monobutyl ether | 4.0 | 4.0 | 4.0 | 4.0 | 4.0 | 4.0 | 4.0 |
| | Triethylene glycol dimethyl ether | — | 5.0 | — | — | — | — | — |
| | Diethylene glycol diethyl ether | — | — | 5.0 | — | — | — | — |
| | Dipropylene glycol dimethyl ether | — | — | — | 5.0 | — | 2.0 | 8.0 |
| | Tripropylene glycol dimethyl ether | 5.0 | — | — | — | 5.0 | — | — |
| | 1,2-Propanediol | 25.0 | 25.0 | 25.0 | 25.0 | 25.0 | 25.0 | 25.0 |
| Resin | Polyurethane resin particle dispersion liquid 1 | — | — | — | — | — | — | — |
| | Polyurethane resin particle dispersion liquid 2 | 50.0 | — | — | — | — | — | — |
| | Polyurethane resin particle dispersion liquid 3 | — | 50.0 | 50.0 | 50.0 | 50.0 | 50.0 | 50.0 |
| Water | Ultrapure water | Residual Amount | Residual Amount | Residual Amount | Residual Amount | Residual Amount | Residual Amount | Residual Amount |
| Total (% by mass) | | 100 | 100 | 100 | 100 | 100 | 100 | 100 |
| Mass Ratio (Glycol ether compound/Urethane resin particles) | | 1.8 | 1.8 | 1.8 | 1.8 | 1.8 | 1.2 | 2.4 |

TABLE 3

| | | Ink | | | | | |
|---|---|---|---|---|---|---|---|
| | | 15 | 16 | 17 | 18 | 19 | 20 |
| Colorant | Magenta pigment | — | 5.0 | 5.0 | 5.0 | 5.0 | 5.0 |
| | Yellow pigment | 5.0 | — | — | — | — | — |
| Organic Solvent | Tripropylene glycol monobutyl ether | 4.0 | 4.0 | 4.0 | 4.0 | 4.0 | 4.0 |
| | Triethylene glycol dimethyl ether | — | — | — | — | — | — |
| | Diethylene glycol diethyl ether | — | — | — | — | — | — |
| | Dipropylene glycol dimethyl ether | 5.0 | — | — | — | 1.8 | 8.2 |

TABLE 3-continued

|  |  | Ink | | | | | |
|---|---|---|---|---|---|---|---|
|  |  | 15 | 16 | 17 | 18 | 19 | 20 |
|  | Tripropylene glycol dimethyl ether | — | — | — | — | — | — |
|  | 1,2-Propanediol | 25.0 | 25.0 | 25.0 | 25.0 | 25.0 | 25.0 |
| Resin | Polyurethane resin particle dispersion liquid 1 | — | 50.0 | — | — | — | — |
|  | Polyurethane resin particle dispersion liquid 2 | — | — | 50.0 | — | — | — |
|  | Polyurethane resin particle dispersion liquid 3 | 50.0 | — | — | 50.0 | 50.0 | 50.0 |
| Water | Ultrapure water | Residual Amount | Residual Amount | Residual Amount | Residual Amount | Residual Amount | Residual Amount |
| Total (% by mass) |  | 100 | 100 | 100 | 100 | 100 | 100 |
| Mass Ratio (Glycol ether compound/Urethane resin particles) |  | 1.8 | 0.8 | 0.8 | 0.8 | 1.2 | 2.4 |

The product names and manufacturers of the materials described in Tables 1 to 3 are listed below.

Magenta pigment: Pigment Red 122 available from Dainichiseika Color & Chemicals Mfg. Co., Ltd.

Yellow pigment: Pigment Yellow 154 available from Dainichiseika Color & Chemicals Mfg. Co., Ltd.

Tripropylene glycol monobutyl ether: available from Dow Chemical Japan Limited

Triethylene glycol dimethyl ether: available from Dow Chemical Japan Limited

Diethylene glycol diethyl ether: available from Dow Chemical Japan Limited

Dipropylene glycol dimethyl ether: available from Dow Chemical Japan Limited

Tripropylene glycol dimethyl ether: available from Dow Chemical Japan Limited 1,2-Propanediol (Propylene glycol): available from Kanto Chemical Co., Inc.

Examples 1 to 39 and Comparative Examples 1 to 10

Image Formation

Figure 5:
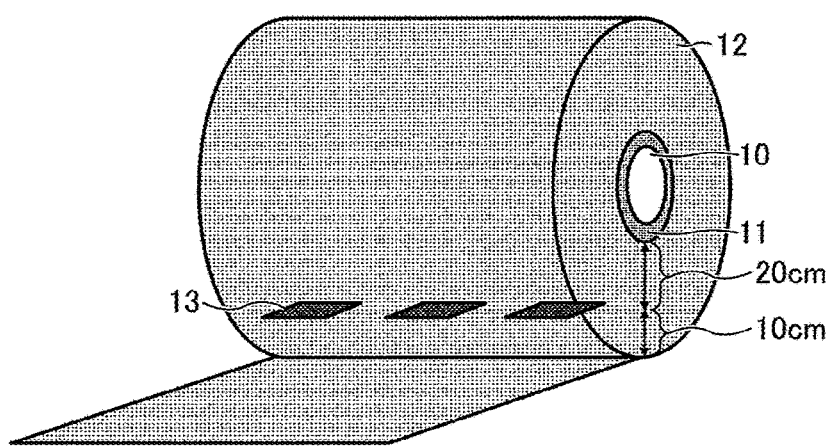
FIG. 5 is a perspective view of a continuous sheet (rolled sheet)
Figure 6:
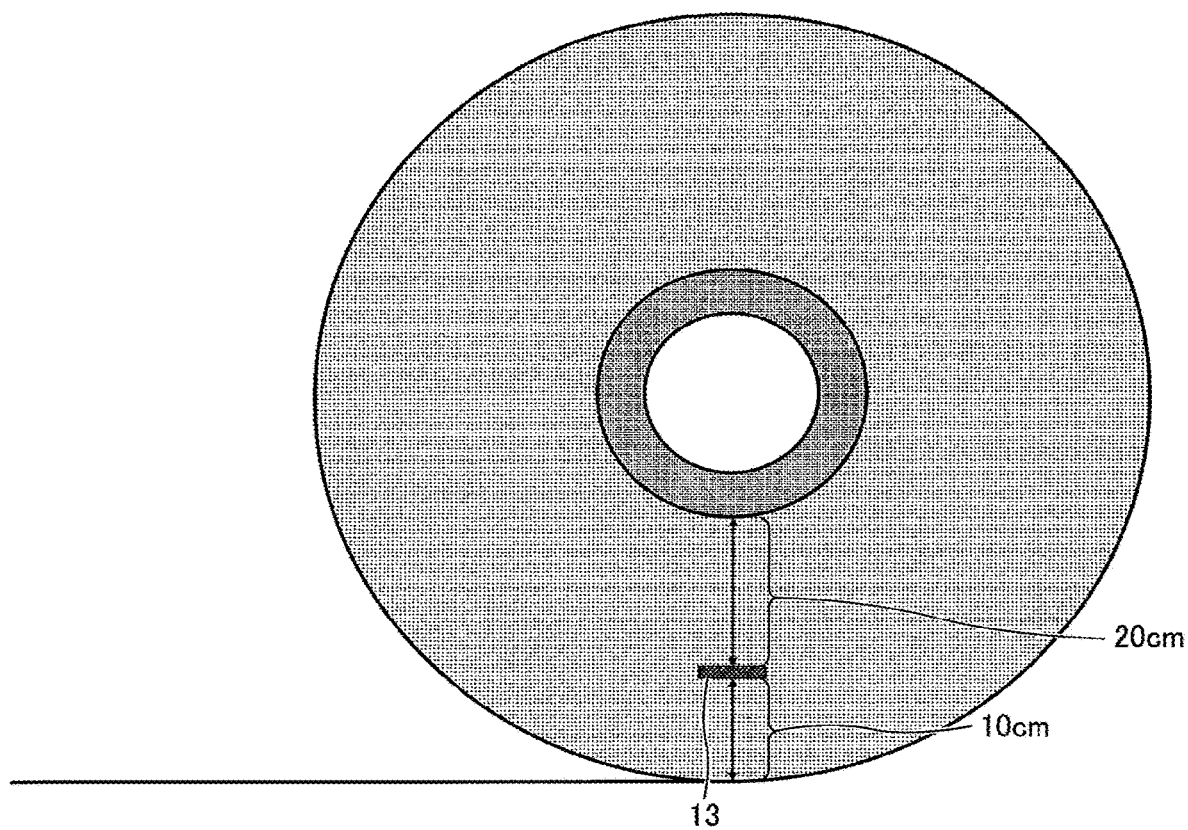
FIG. 6 is a side view of the continuous sheet (rolled sheet) illustrated in FIG. 5.

An inkjet printing system (RICOH Pro VC60000 available from Ricoh Co., Ltd.) was loaded with each of the inks 1 to 20. Images were formed by this system on both sides of a recording medium and subjected to evaluations. As the recording medium, LAG90 (available from Stora Enso, having a width of 520.7 mm), Magno Plus Silk (available from Sappi Global), and Mango Gloss (available from Sappi Global) were used as shown in Tables 4 and 5, each of which being a rolled sheet. Each rolled sheet was set in the printing system and a solid image having a resolution of 1,200 dpi was recorded thereon. As the winder, a Rewinding Module RW6 (available from Hunkler) was used. The winder performed winding of the sheet so that the pressure was adjusted as shown in Tables 4 and 5 by simply stacking the sheet. The image was subjected to the evaluations in terms of blocking resistance, abrasion resistance, and glossiness. Next, the recording medium having the image thereon was set in the printing system again. Another solid image having a resolution of 1,200 dpi was recorded thereon after replacing the ink ("first ink") with a black ink ("second ink"). The image was subjected to the evaluation of position misalignment at the second ink application. The pressure applied to the image on the recording medium was measured by a surface pressure distribution measuring system I-SCAN (available from Nitta Corporation) and a sensor sheet I-SCAN #5027 (available from Nitta Corporation). More specifically, as illustrated in FIGS. 5 and 6, a continuous sheet 12 was wound in a roll and sensor sheets 13 were placed at the positions 20 cm away from the outside of a paper core 11 having a hollow 10. The three sensor sheets 13 were placed at different positions relative to the width direction of the continuous sheet 12, thus setting three measuring points. Winding of the continuous sheet 12 was continued until the sheet stacked above the three measuring points came to have a thickness of 10 cm. At this time, the pressure was measured at each measuring points. The pressure values measured at the three measuring points were averaged to determine the pressure applied to the image. The evaluation results are shown in Tables 4 and 5.

With respect to LAG90, the transfer amount of pure water within contact times of 100 ms and 400 ms are 2.9 mL/m² and 4.9 mL/m², respectively, when measured by the dynamic scanning absorptometer ("DSA") disclosed in a paper entitled "Development and application of dynamic scanning absorptometer—Automation and improvement of Bristow measurement—", Shigenori Kuga, Japan Tappi Journal, Volume 48, 1994, No. 5, pp. 730-734.

With respect to Mango Plus Silk, the transfer amount of pure water within contact times of 100 ms and 400 ms are 2.5 mL/m² and 4.3 mL/m², respectively, when measured by the dynamic scanning absorptometer ("DSA") disclosed in a paper entitled "Development and application of dynamic scanning absorptometer—Automation and improvement of Bristow measurement—", Shigenori Kuga, Japan Tappi Journal, Volume 48, 1994, No. 5, pp. 730-734.

With respect to Mango Gloss, the transfer amount of pure water within contact times of 100 ms and 400 ms are 1.8 mL/m² and 3.5 mL/m², respectively, when measured by the dynamic scanning absorptometer ("DSA") disclosed in a paper entitled "Development and application of dynamic scanning absorptometer—Automation and improvement of Bristow measurement—", Shigenori Kuga, Japan Tappi Journal, Volume 48, 1994, No. 5, pp. 730-734.

Blocking Resistance

The sheet was visually observed to determine the degree of sticking between images and the degree of image transfer (offset). Blocking resistance was evaluated based on the following evaluation criteria. Rank 7 or more are good quality. Rank 10 is the best quality. Rank 3 or less is significantly poor quality.

Evaluation Criteria

| | |
|---|---|
| 10: | Sheets were not sticking together. No image peeling was observed. Visually uniform image. |
| 9: | Sheets were not sticking together. No image peeling observed. Small image void less than 10 μm was observed. |
| 8: | Sheets were not sticking together. No image peeling observed. Small image void less than 20 μm but not less than 10 μm was observed. |
| 7: | Sheets were not sticking together. No image peeling observed. Small image void less than 30 μm but not less than 20 μm was observed. |
| 6: | Sheets were not sticking together. No image peeling observed. Small image void less than 40 μm but not less than 30 μm was observed. |
| 3: | Sheets were sticking together. Significant image missing was observed. |
| 1: | Sheets were sticking together. Significant image missing and sheet missing were observed. |
| 0: | Sheets were sticking together and united. |

Abrasion Resistance

Each image was rubbed with a 1.2-cm-square piece of paper (LAG90 available from Stora Enso) 20 times. Image density of the paper was measured thereafter by a reflective color spectrophotometric densitometer (available from X-Rite) and the background image density of the paper was subtracted therefrom to determine the transferred ink density. Abrasion resistance was evaluated based on the following evaluation criteria.

Evaluation Criteria

A: The transferred ink density was less than 0.05.
B: The transferred ink density was not less than 0.05 and less than 0.10.
C: The transferred ink density was not less than 0.10.

Glossiness

Each image was subjected to a measurement of 60° gloss by a gloss meter (Micro-TRI-Gloss 4520 available from BYK Gardner) before and after being pressurized.

Position Misalignment at Second Ink Application

The image was visually observed to determine whether position misalignment had occurred in the second ink application relative to the first ink application.

Evaluation Criteria

A: Position misalignment did not occur.
C: Position misalignment occurred.

TABLE 4

| | | | | Logarithmic damping ratio | | | Evaluation results | | | | |
|---|---|---|---|---|---|---|---|---|---|---|---|
| | | | | | | | | | Gloss | | Position |
| | | Ink No. | Recording medium | Maximum value | Elapsed time (sec) | Pressure (kg/cm²) | Blocking resistance | Abrasion resistance | Before Pressure | After Pressure | Mis-alignment |
| Examples | 1 | 1 | LAG90 | 1.50 | 3,800 | 8.0 | 7 | A | 31 | 41 | A |
| | 2 | | LAG90 | | | 7.3 | 8 | A | | 40 | A |
| | 3 | | LAG90 | | | 5.8 | 8 | A | | 39 | A |
| | 4 | | LAG90 | | | 4.6 | 9 | A | | 38 | A |
| | 5 | | LAG90 | | | 3.5 | 9 | A | | 38 | A |
| | 6 | 2 | LAG90 | 1.48 | 3,600 | 8.0 | 8 | A | 31 | 41 | A |
| | 7 | | LAG90 | | | 3.5 | 9 | A | | 39 | A |
| | 8 | 3 | LAG90 | 1.40 | 3,400 | 8.0 | 9 | A | 31 | 41 | A |
| | 9 | | LAG90 | | | 3.5 | 10 | A | | 39 | A |
| | 10 | 4 | LAG90 | 1.45 | 3,200 | 8.0 | 9 | A | 31 | 41 | A |
| | 11 | | LAG90 | | | 3.5 | 10 | A | | 39 | A |
| | 12 | 5 | LAG90 | 1.35 | 3,700 | 8.0 | 8 | A | 31 | 41 | A |
| | 13 | | LAG90 | | | 3.5 | 9 | A | | 39 | A |
| | 14 | 6 | LAG90 | 1.33 | 3,500 | 8.0 | 8 | A | 31 | 41 | A |
| | 15 | | LAG90 | | | 3.5 | 9 | A | | 39 | A |
| | 16 | 7 | LAG90 | 1.26 | 3,300 | 8.0 | 10 | A | 31 | 41 | A |
| | 17 | | LAG90 | | | 3.5 | 10 | A | | 39 | A |
| | 18 | 8 | LAG90 | 1.31 | 3,100 | 8.0 | 9 | A | 31 | 41 | A |
| | 19 | | LAG90 | | | 3.5 | 10 | A | | 39 | A |
| | 20 | 9 | LAG90 | 0.75 | 2,500 | 8.0 | 9 | A | 32 | 42 | A |
| | 21 | | LAG90 | | | 3.5 | 10 | A | | 40 | A |
| | 22 | 10 | LAG90 | 0.74 | 2,000 | 8.0 | 9 | A | 32 | 42 | A |
| | 23 | | LAG90 | | | 3.5 | 10 | A | | 40 | A |
| | 24 | 11 | LAG90 | 0.70 | 1,800 | 8.0 | 10 | A | 32 | 42 | A |
| | 25 | | LAG90 | | | 3.5 | 10 | A | | 40 | A |
| | 26 | 12 | LAG90 | 0.73 | 1,700 | 8.0 | 10 | A | 32 | 42 | A |
| | 27 | | LAG90 | | | 3.5 | 10 | A | | 40 | A |
| | 28 | 13 | LAG90 | 0.93 | 3,300 | 8.0 | 8 | A | 32 | 42 | A |
| | 29 | | LAG90 | | | 3.5 | 10 | A | | 40 | A |
| | 30 | 14 | LAG90 | 1.33 | 3,400 | 8.0 | 9 | A | 32 | 42 | A |
| | 31 | | LAG90 | | | 3.5 | 10 | A | | 40 | A |
| | 32 | 15 | LAG90 | 0.71 | 1,900 | 8.0 | 10 | A | 32 | 42 | A |
| | 33 | | LAG90 | | | 3.5 | 10 | A | | 40 | A |

TABLE 5

| | | Ink No. | Recording medium | Logarithmic damping ratio Maximum value | Logarithmic damping ratio Elapsed time (sec) | Pressure (kg/cm²) | Evaluation results Blocking resistance | Abrasion resistance | Gloss Before Pressure | Gloss After Pressure | Position Misalignment |
|---|---|---|---|---|---|---|---|---|---|---|---|
| Examples | 34 | 11 | Magno Plus Silk | 0.70 | 1,800 | 8.0 | 10 | A | 37 | 49 | A |
| | 35 | | Magno Plus Silk | | | 3.5 | 10 | A | | 44 | A |
| | 36 | 11 | Magno Gloss | 0.70 | 1,800 | 8.0 | 10 | A | 35 | 47 | A |
| | 37 | | Magno Gloss | | | 3.5 | 10 | A | | 41 | A |
| | 38 | 1 | LAG90 | 1.50 | 3,800 | 8.2 | 6 | A | 31 | — | A |
| | 39 | | LAG90 | | | 3.1 | 10 | B | | 39 | C |
| Comparative Examples | 1 | 16 | LAG90 | 3.70 | 5,000 | 8.0 | 0 | A | 31 | — | A |
| | 2 | | LAG90 | | | 3.5 | 0 | A | | — | A |
| | 3 | 17 | LAG90 | 2.42 | 4,900 | 8.0 | 0 | A | 31 | — | A |
| | 4 | | LAG90 | | | 3.5 | 1 | A | | — | A |
| | 5 | 18 | LAG90 | 2.10 | 4,200 | 8.0 | 0 | A | 32 | — | A |
| | 6 | | LAG90 | | | 3.5 | 1 | A | | — | A |
| | 7 | 19 | LAG90 | 1.11 | 3,900 | 8.0 | 0 | A | 32 | — | A |
| | 8 | | LAG90 | | | 3.5 | 3 | A | | — | A |
| | 9 | 20 | LAG90 | 1.62 | 3,700 | 8.0 | 0 | A | 32 | — | A |
| | 10 | | LAG90 | | | 3.5 | 3 | A | | — | A |

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An image forming apparatus comprising:
an ink comprising water, an organic solvent, and a colorant;
a recording head configured to discharge the ink to a continuous sheet;
a winder configured to wind up the continuous sheet applied with the ink,
wherein, when the ink is formed into an ink film, a maximum value of logarithmic damping ratio of the ink film is 1.50 or less and a time elapsed until the logarithmic damping ratio reaches the maximum value is 3,800 seconds or less, when measured by a rigid-body pendulum test at 60° C.

2. The image forming apparatus of claim 1, further comprising:
a continuous sheet feeder configured to feed the continuous sheet.

3. The image forming apparatus of claim 1, wherein the ink further comprises urethane resin particles.

4. The image forming apparatus of claim 3, wherein the organic solvent in the ink comprises a glycol ether compound, and a mass ratio of the glycol ether compound to the urethane resin particles is in the range of from 0.4 to 1.8.

5. The image forming apparatus of claim 1, wherein the organic solvent in the ink comprises 1,2-butanediol and 2-pyrrolidone.

6. The image forming apparatus of claim 5, wherein the organic solvent the ink further comprises a glycol ether compound.

7. The image forming apparatus of claim 6 wherein a content of the organic solvent in the ink is in a range of 10% to 60% by mass.

8. The image forming apparatus of claim 7, wherein the content of the organic solvent in the ink is in a range of 20% to 60% by mass.

9. The image forming apparatus of claim 8, wherein the ink further comprises an acrylic resin.

10. The image forming apparatus of claim 9, wherein the maximum value of logarithmic damping ratio of the ink film is from 0.01 to 1.30 and the time elapsed until the logarithmic damping ratio reaches the maximum value is from 100 to 3,000 seconds, when measured by the rigid-body pendulum test at 60° C.

11. The image forming apparatus of claim 9, wherein the maximum value of logarithmic damping ratio of the ink film is from 0.7 to 1.50 and the time elapsed until the logarithmic damping ratio reaches the maximum value is from 100 to 3,000 seconds, when measured by the rigid-body pendulum test at 60° C.

12. The image forming apparatus of claim 9, wherein the maximum value of logarithmic damping ratio of the ink film is from 0.01 to 1.30 and the time elapsed until the logarithmic damping ratio reaches the maximum value is from 1,700 to 3,000 seconds, when measured by the rigid-body pendulum test at 60° C.

13. An ink comprising:
water;
an organic solvent; and
a colorant,
wherein a content of the organic solvent in the ink is in a range of 10% to 60% by mass, and
when the ink is formed into an ink film, a maximum value of logarithmic damping ratio of the ink film is 1.50 or less and a time elapsed until the logarithmic damping ratio reaches the maximum value is 3,800 seconds or less, when measured by a rigid-body pendulum test at 60° C.

14. The ink of claim 13, wherein a content of the organic solvent in the ink is in a range of 20% to 60% by mass.

15. The ink of claim 13, wherein the organic solvent comprises 1,2-butanediol and 2-pyrrolidone.

16. The ink of claim 15, wherein the organic solvent further comprises a glycol ether compound.

17. The ink of claim 16, further comprising an acrylic resin.

18. The ink of claim 17, wherein the maximum value of logarithmic damping ratio of the ink film is from 0.01 to 1.30 and the time elapsed until the logarithmic damping ratio reaches the maximum value is from 100 to 3,000 seconds, when measured by the rigid-body pendulum test at 60° C.

19. The ink of claim 17, wherein the maximum value of logarithmic damping ratio of the ink film is from 0.7 to 1.50 and the time elapsed until the logarithmic damping ratio reaches the maximum value is from 100 to 3,000 seconds, when measured by the rigid-body pendulum test at 60° C.

20. The ink of claim 17, wherein the maximum value of logarithmic damping ratio of the ink film is from 0.01 to 1.30 and the time elapsed until the logarithmic damping ratio reaches the maximum value is from 1,700 to 3,000 seconds, when measured by the aid-body pendulum test at 60° C.

21. The ink of claim 16, further comprising a urethane resin.

22. An image forming method comprising:
    (a) applying an ink to a continuous sheet to forth an image; and
    (b) winding the continuous sheet to which the ink has been applied into a roll,
    wherein the ink comprises water, an organic solvent, and a colorant,
    wherein a content of the organic solvent in the ink is in a range of 10% to 60% by mass, and
    wherein, when the ink is formed into an ink film, a maximum value of logarithmic damping ratio of the ink film is 1.50 or less and a time elapsed until the logarithmic damping ratio reaches the maximum value is 3,800 seconds or less, when measured by a rigid-body pendulum test at 60° C.

23. The image forming method of claim 22, wherein a content of the organic solvent in the ink is in a range of 20% to 60% by mass.

24. The image forming method of claim 22, wherein the organic solvent in the ink comprises 1,2-butanediol and 2-pyrrolidone.

25. The image forming method of claim 24, Wherein the organic solvent in the ink further comprises a glycol ether compound.

26. The image forming method of claim 25, wherein the ink further comprises an acrylic resin.

27. The image forming method of claim 26, wherein the maximum value of logarithmic damping ratio of the ink film is from 0.01 to 1.30 and the time elapsed until the logarithmic damping ratio reaches the maximum value is from 100 to 3,000 seconds, when measured by the rigid-body pendulum test at 60° C.

28. The image forming method of claim 26, wherein the maximum value of logarithmic damping ratio of the ink film is from 0.7 to 1.50 and the time elapsed until the logarithmic damping ratio reaches the maximum value is from 100 to 3,000 seconds, when measured by the rigid-body pendulum test at 60° C.

29. The image forming method of claim 28, further comprising:
    (c) feeding the continuous sheet before (a).

30. The image forming method of claim 26, wherein the maximum value of logarithmic damping ratio of the ink film is from 0.01 to 1.30 and the time elapsed until the logarithmic damping ratio reaches the maximum value is from 1,700 to 3,000 seconds, when measured by the rigid-body pendulum test at 60° C.

31. The image forming method of claim 25, Wherein the ink further comprises a urethane resin.

* * * * *